(12) United States Patent  
Jain et al.

(10) Patent No.: US 10,761,889 B1  
(45) Date of Patent: Sep. 1, 2020

(54) SYSTEMS AND METHODS FOR AUTOSCALING INSTANCE GROUPS OF COMPUTING PLATFORMS

(71) Applicant: Palantir Technologies Inc., Palo Alto, CA (US)

(72) Inventors: Ashray Jain, London (GB); Ryan McNamara, Seattle, WA (US); Greg DeArment, Seattle, WA (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

(21) Appl. No.: 16/672,913

(22) Filed: Nov. 4, 2019

Related U.S. Application Data

(60) Provisional application No. 62/902,312, filed on Sep. 18, 2019.

(51) Int. Cl.
*G06F 9/44* (2018.01)
*G06F 9/50* (2006.01)

(52) U.S. Cl.
CPC .... *G06F 9/5005* (2013.01); *G06F 2209/5021* (2013.01); *G06F 2209/5022* (2013.01)

(58) Field of Classification Search
CPC ........... G06F 9/5005; G06F 2209/5021; G06F 2209/5022
See application file for complete search history.

(56) References Cited

U.S. PATENT DOCUMENTS

| | | |
|---|---|---|
| 5,978,475 A | 11/1999 | Schneier et al. |
| 6,253,203 B1 | 6/2001 | O'Flaherty et al. |
| 6,725,240 B1 | 4/2004 | Asad et al. |
| 6,807,569 B1 | 10/2004 | Bhimani et al. |
| 7,017,046 B2 | 3/2006 | Doyle et al. |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

VirusTotal—About, <http://www.virustotal.com/en/about/> Printed Jun. 30, 2014 in 8 pages.

Schneier et al., "Automatic Event Stream Notarization Using Digital Signatures," Security Protocols, International Workshop Apr. 1996 Proceedings, Springer-Verlag, 1997.

(Continued)

*Primary Examiner* — Wissam Rashid
(74) *Attorney, Agent, or Firm* — Faegre Drinker Biddle & Reath LLP—Palantir

(57) ABSTRACT

Systems and methods scale an instance group of a computing platform by determining whether to scale up or down the instance group by using historical data from prior jobs wherein the historical data includes one or more of: a data set size used in a prior related job and a code version for a prior related job. The systems and methods also scale the instance group up or down based on the determination. In some examples, systems and methods scale an instance group of a computing platform by determining whether to scale up or down the instance group by at least evaluating on-demand job request data for resource units (RUs), observing current job state data, and predicting resource unit need using historical data from prior related job executions. The systems and methods scale the instance group up or down based on the determination.

17 Claims, 10 Drawing Sheets

(56) References Cited

U.S. PATENT DOCUMENTS

| | | |
|---|---|---|
| 7,069,586 B1 | 6/2006 | Winneg et al. |
| 7,225,468 B2 | 5/2007 | Waisman et al. |
| 7,596,285 B2 | 9/2009 | Brown et al. |
| 7,770,032 B2 | 8/2010 | Nesta et al. |
| 7,801,871 B2 | 9/2010 | Gosnell |
| 7,962,495 B2 | 6/2011 | Jain et al. |
| 8,141,036 B2 | 3/2012 | Wagner et al. |
| 8,181,253 B1 | 5/2012 | Zaitsev et al. |
| 8,190,893 B2 | 5/2012 | Benson et al. |
| 8,196,184 B2 | 6/2012 | Amirov et al. |
| 8,239,668 B1 | 8/2012 | Chen et al. |
| 8,301,904 B1 | 10/2012 | Gryaznov |
| 8,312,546 B2 | 11/2012 | Alme |
| 8,392,902 B2 | 3/2013 | Reinz |
| 8,646,080 B2 | 2/2014 | Williamson et al. |
| 8,667,456 B1 | 3/2014 | Czymontek |
| 8,683,322 B1 | 3/2014 | Cooper |
| 8,726,379 B1 | 5/2014 | Stiansen et al. |
| 8,769,412 B2 | 7/2014 | Gill et al. |
| 8,782,794 B2 | 7/2014 | Ramcharran |
| 8,856,797 B1 | 10/2014 | Siddiqui et al. |
| 8,881,142 B1 | 11/2014 | Reid et al. |
| 8,931,043 B2 | 1/2015 | Cooper et al. |
| 9,021,260 B1 | 4/2015 | Falk et al. |
| 9,049,117 B1 | 6/2015 | Nucci et al. |
| 9,100,428 B1 | 8/2015 | Visbal |
| 9,335,897 B2 | 5/2016 | Goldenberg |
| 9,338,013 B2 | 5/2016 | Castellucci et al. |
| 9,514,327 B2 | 12/2016 | Ford |
| 9,721,117 B2 | 8/2017 | Pleau et al. |
| 10,079,832 B1 | 9/2018 | DeArment et al. |
| 10,284,415 B1 | 5/2019 | Alabsi |
| 10,324,763 B1 | 6/2019 | Abdelsalam et al. |
| 10,397,229 B2 | 8/2019 | DeArment et al. |
| 2002/0112157 A1 | 8/2002 | Doyle et al. |
| 2004/0073814 A1 | 4/2004 | Miyazaki et al. |
| 2004/0123139 A1 | 6/2004 | Aiello et al. |
| 2004/0153418 A1 | 8/2004 | Hanweck |
| 2004/0250124 A1 | 12/2004 | Chesla et al. |
| 2005/0157662 A1 | 7/2005 | Bingham et al. |
| 2005/0229256 A2 | 10/2005 | Banzhof |
| 2005/0262556 A1 | 11/2005 | Waisman et al. |
| 2005/0275638 A1 | 12/2005 | Kalmykov-Zotov et al. |
| 2006/0031928 A1 | 2/2006 | Conley et al. |
| 2006/0069912 A1 | 3/2006 | Zheng et al. |
| 2006/0179003 A1 | 8/2006 | Steele et al. |
| 2006/0121931 A1 | 9/2006 | Shull et al. |
| 2006/0218637 A1 | 9/2006 | Thomas et al. |
| 2006/0265747 A1 | 11/2006 | Judge |
| 2007/0074204 A1 | 3/2007 | Curtis et al. |
| 2007/0143851 A1 | 6/2007 | Nicodemus |
| 2007/0294766 A1 | 12/2007 | Mir et al. |
| 2008/0104407 A1 | 5/2008 | Horne et al. |
| 2008/0201580 A1 | 8/2008 | Savitzky et al. |
| 2008/0222706 A1 | 9/2008 | Renaud et al. |
| 2008/0229422 A1 | 9/2008 | Hudis et al. |
| 2009/0103442 A1 | 4/2009 | Douville |
| 2009/0228701 A1 | 9/2009 | Lin |
| 2009/0328222 A1 | 12/2009 | Helman et al. |
| 2010/0077481 A1 | 3/2010 | Polyakov et al. |
| 2010/0100963 A1 | 4/2010 | Mahaffey |
| 2010/0153945 A1 | 6/2010 | Bansal et al. |
| 2010/0179831 A1 | 7/2010 | Brown et al. |
| 2010/0235915 A1 | 9/2010 | Memon et al. |
| 2010/0262688 A1 | 10/2010 | Hussain et al. |
| 2010/0309510 A1 | 12/2010 | Hansen |
| 2010/0325159 A1 | 12/2010 | Wright et al. |
| 2010/0330801 A1 | 12/2010 | Rouh |
| 2011/0060910 A1 | 3/2011 | Gormish et al. |
| 2011/0126127 A1 | 5/2011 | Mariotti et al. |
| 2011/0202555 A1 | 8/2011 | Cordover et al. |
| 2011/0219450 A1 | 9/2011 | McDougal et al. |
| 2012/0079592 A1 | 3/2012 | Pandrangi |
| 2012/0084866 A1 | 4/2012 | Stolfo |
| 2012/0110633 A1 | 5/2012 | An et al. |
| 2012/0110674 A1 | 5/2012 | Belani et al. |
| 2012/0169593 A1 | 7/2012 | Mak et al. |
| 2012/0218305 A1 | 8/2012 | Patterson et al. |
| 2012/0254129 A1 | 10/2012 | Wheeler et al. |
| 2012/0284791 A1 | 11/2012 | Miller et al. |
| 2012/0330801 A1 | 12/2012 | McDougal et al. |
| 2013/0019306 A1 | 1/2013 | Lagar-Cavilla et al. |
| 2013/0097709 A1 | 4/2013 | Basavapatna et al. |
| 2013/0110876 A1 | 5/2013 | Meijer et al. |
| 2013/0139268 A1 | 5/2013 | An et al. |
| 2013/0211911 A1 | 8/2013 | Krietzman |
| 2013/0227710 A1 | 8/2013 | Barak et al. |
| 2013/0239217 A1 | 9/2013 | Kindler et al. |
| 2013/0247142 A1 | 9/2013 | Nishizawa et al. |
| 2013/0254384 A1 | 9/2013 | Wray |
| 2014/0013451 A1 | 1/2014 | Kulka et al. |
| 2014/0059683 A1 | 2/2014 | Ashley |
| 2014/0123279 A1 | 5/2014 | Bishop et al. |
| 2014/0129550 A1 | 5/2014 | Weatherhead et al. |
| 2014/0143009 A1 | 5/2014 | Brice et al. |
| 2014/0165038 A1 | 6/2014 | Kaler et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0229422 A1 | 8/2014 | Jain et al. |
| 2014/0283107 A1 | 9/2014 | Walton et al. |
| 2014/0366132 A1 | 12/2014 | Stiansen et al. |
| 2015/0039565 A1 | 2/2015 | Lucas |
| 2015/0128274 A1 | 5/2015 | Giokas |
| 2015/0134600 A1 | 5/2015 | Eisner et al. |
| 2015/0143363 A1 | 5/2015 | Gombert et al. |
| 2015/0188715 A1 | 7/2015 | Castelluci et al. |
| 2015/0200948 A1 | 7/2015 | Cairns et al. |
| 2015/0229664 A1 | 8/2015 | Hawthorn et al. |
| 2015/0248563 A1 | 9/2015 | Alfarano et al. |
| 2015/0261847 A1 | 9/2015 | Ducott et al. |
| 2015/0278311 A1 | 10/2015 | Isherwood et al. |
| 2015/0286665 A1 | 10/2015 | Nyman et al. |
| 2015/0312188 A1 | 10/2015 | White et al. |
| 2015/0326601 A1 | 11/2015 | Grandin et al. |
| 2016/0004864 A1 | 1/2016 | Falk et al. |
| 2016/0028759 A1 | 1/2016 | Visbal |
| 2016/0103717 A1 | 4/2016 | Dettori et al. |
| 2016/0182309 A1 | 6/2016 | Maturana et al. |
| 2016/0323377 A1 * | 11/2016 | Einkauf .............. H04L 67/1076 |
| 2017/0091466 A1 | 3/2017 | Meyer et al. |
| 2017/0185715 A9 | 6/2017 | Smith |
| 2017/0192986 A1 | 7/2017 | Isherwood et al. |
| 2017/0323117 A1 | 11/2017 | Pleau et al. |
| 2018/0024975 A1 | 1/2018 | Ramakrishnan et al. |
| 2018/0241812 A1 | 8/2018 | Marchetti et al. |
| 2018/0316751 A1 | 11/2018 | Shen et al. |
| 2019/0289009 A1 | 9/2019 | DeArment et al. |

FOREIGN PATENT DOCUMENTS

| | | | |
|---|---|---|---|
| EP | 1962222 | 8/2008 | |
| EP | 2804101 A2 | 11/2014 | |
| EP | 2892197 | 7/2015 | |
| EP | 2897051 | 7/2015 | |
| EP | 2963578 | 1/2016 | |
| EP | 2985974 | 2/2016 | |
| EP | 3035619 A1 * | 6/2016 | ............ G06F 11/301 |
| EP | 3188069 | 7/2017 | |
| NL | 2011642 | 8/2015 | |
| WO | 2005/010685 | 2/2005 | |

OTHER PUBLICATIONS

Crosby et al., "Efficient Data Structures for Tamper-Evident Logging," Department of Computer Science, Rice University, 2009, pp. 17.

Ma et al., "A New Approach to Secure Logging," ACM Transactions on Storage, vol. 5, No. 1, Article 2, Published Mar. 2009, 21 pages.

Glaab et al., "EnrichNet: Network-Based Gene Set Enrichment Analysis," Bioinformatics 28.18 (2012): pp. i451-i457.

(56) References Cited

OTHER PUBLICATIONS

FireEye, <http://www.fireeye.com/> Printed Jun. 30, 2014 in 2 pages.

Lee et al., "A Data Mining and CIDF Based Approach for Detecting Novel and Distributed Intrusions," Lecture Notes in Computer Science, vol. 1907 Nov. 11, 2000, pp. 49-65.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

FireEye—Products and Solutions Overview, <http://www.fireeye.com/products-and-solutions> Printed Jun. 30, 2014 in 3 pages.

Bhuyan et al., "Network Anomaly Detection: Methods, Systems and Tools," First Quarter 2014, IEEE.

Baker et al., "The Development of a Common Enumeration of Vulnerabilities and Exposures," Presented at the Second International Workshop on Recent Advances in Intrusion Detection, Sep. 7-9, 1999, pp. 35.

Hur et al., "SciMiner: web-based literature mining tool for target identification and functional enrichment analysis," Bioinformatics 25.6 (2009): pp. 838-840.

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl 2 (2008): pp. W385-W363.

European Patent Office; Official Communication for Application No. 17197000.7; dated Mar. 8, 2018.

United States Patent and Trademark Office; Official Communication for U.S. Appl. No. 16/134,586; dated Mar. 8, 2019.

United States Patent and Trademark Office; Official Communication for U.S. Appl. No. 15/826,321; dated Jan. 26, 2018.

United States Patent and Trademark Office; Official Communication for U.S. Appl. No. 15/826,321; dated May 18, 2018.

United States Patent and Trademark Office; Official Communication for U.S. Appl. No. 16/255,715; dated Apr. 4, 2019.

United States Patent and Trademark Office; Official Communication for U.S. Appl. No. 16/134,586; dated Apr. 17, 2019.

European Patent Office; EP Partial Search Report; EP Appl. No. 19206839.3; dated May 19, 2020.

\* cited by examiner

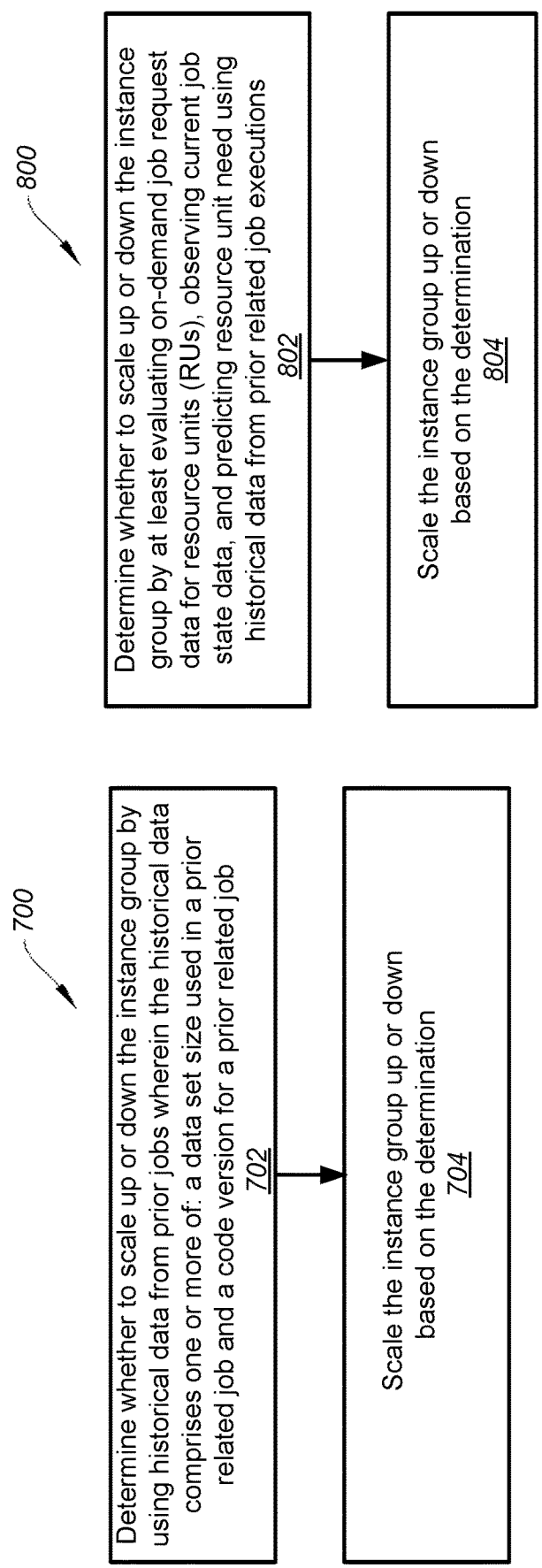

SYSTEMS AND METHODS FOR AUTOSCALING INSTANCE GROUPS OF COMPUTING PLATFORMS

1. CROSS REFERENCE TO RELATED APPLICATIONS

This application claims priority to U.S. Provisional Application No. 62/902,312, filed Sep. 18, 2019, incorporated by reference herein for all purposes.

2. BACKGROUND

Certain embodiments of the present invention are directed to computing platforms including instance groups. More particularly, some embodiments of the present invention provide systems and methods for autoscaling instance groups of computing platforms.

With the number of customers of a computing platform increasing, the demands on resources provided by the computing platform are also increasing. In some examples, customers are running their applications on multiple instances across the computing platform with certain resources allocated to each instance. Each instance, for example, includes a virtual server running on a particular host machine of the computing platform, and offers different compute and memory capabilities and resources. Thousands and thousands of jobs can be starting and stopping in the computing platform at one time. Thus, managing instances and resources across a computing platform becomes increasingly more complex with the number of instances and the amount of resources increasing. For example, conventional computing platforms are generally not very efficient in utilizing resources allocated to particular instances of the computing platform. In another example, conventional computing platforms are not easily stood up multiple times for an increased number of customers. Determining whether to scale up or down the number of instances to efficiently use the computing platform is growing more difficult with growing platform demand.

Hence it is highly desirable to improve the techniques for autoscaling instance groups on computing platforms.

3. SUMMARY

Certain embodiments of the present invention are directed to computing platforms including instance groups. More particularly, some embodiments of the present invention provide systems and methods for autoscaling instance groups of computing platforms.

According to some embodiments, a system and method scales an instance group of a computing platform by determining whether to scale up or down the instance group by using historical data from prior jobs wherein the historical data comprises one or more of: a data set size used in a prior related job and a code version for a prior related job. The system and method also scale the instance group up or down based on the determination. The method is performed using one or more processors.

According to certain embodiments, a system and method scales an instance group of a computing platform by determining whether to scale up or down the instance group by at least evaluating on-demand job request data for resource units (RUs), observing current job state data, and predicting resource unit need using historical data from prior related job executions. The system and method scale the instance group up or down based on the determination. The method is performed using one or more processors.

According to some embodiments, a system and method scales an instance group of a computing platform by determining a job dependency tree for a plurality of related jobs and determining runtime data for each of the jobs in the dependency tree. The system and method scales up or down the instance group based on the determined runtime data. The method is performed using one or more processors.

According to certain embodiments, systems and methods use a combination of on-demand control, observational control and predictive control to determine whether to scale up or down the instances of an instance group. In certain examples, predictive control is based on evaluating historical data such as data set sizes used in a previous related job and/or whether code used in the current job has changed from code used in a related job (e.g., same job). In certain examples, observational control for scaling is based on determining a job dependency tree for a plurality of related jobs and determining runtime data for each of the jobs in the dependency tree.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 7 is a simplified diagram showing a method for scaling an instance group of a computing platform according to one embodiment of the present invention;

FIG. 8 is a simplified diagram showing a method for scaling an instance group of a computing platform according to one embodiment of the present invention;

5. DETAILED DESCRIPTION

Conventional systems and methods are often not capable of efficiently utilizing resources allocated to instances on a computing platform at any given time.

In some embodiments, benefits include significant improvements, including, for example, increased efficiency and speed, in standing up a computing platform multiple times for an increased number of customers. In certain embodiments, other benefits include improved utilization of resources allocated to instances across the computing platform, and increased security and enhanced resiliency of the operating platform. Benefits of some embodiments include maximizing the percentage of provisioned resources that are allocated to pods by the computing platform at any given time. In some embodiments, systems and methods are configured to terminate instances and/or autoscale instance groups of a computing platform.

In certain embodiments, one or more solutions rooted in computer technology overcome one or more problems specifically arising in the realm of computer technology. Some embodiments are directed to computing platforms including instance groups. More particularly, some embodiments of the present invention provide systems and methods for terminating instances and autoscaling instance groups of computing platforms. In some examples, an instance running on the computing platform is associated with an instance group. In certain examples, an instance includes a virtual server or virtual machine. In other examples, an instance includes a virtual computing environment that provides an operating system and/or an application server for running one or more containers. For example, a container includes a containerized application. In some examples, one or more instances run on a server or host machine of the computing platform and are associated with particular resources that include CPU, memory, storage, and/or networking capacity. In certain examples, an instance group is associated with one or more instances.

Figure 1:
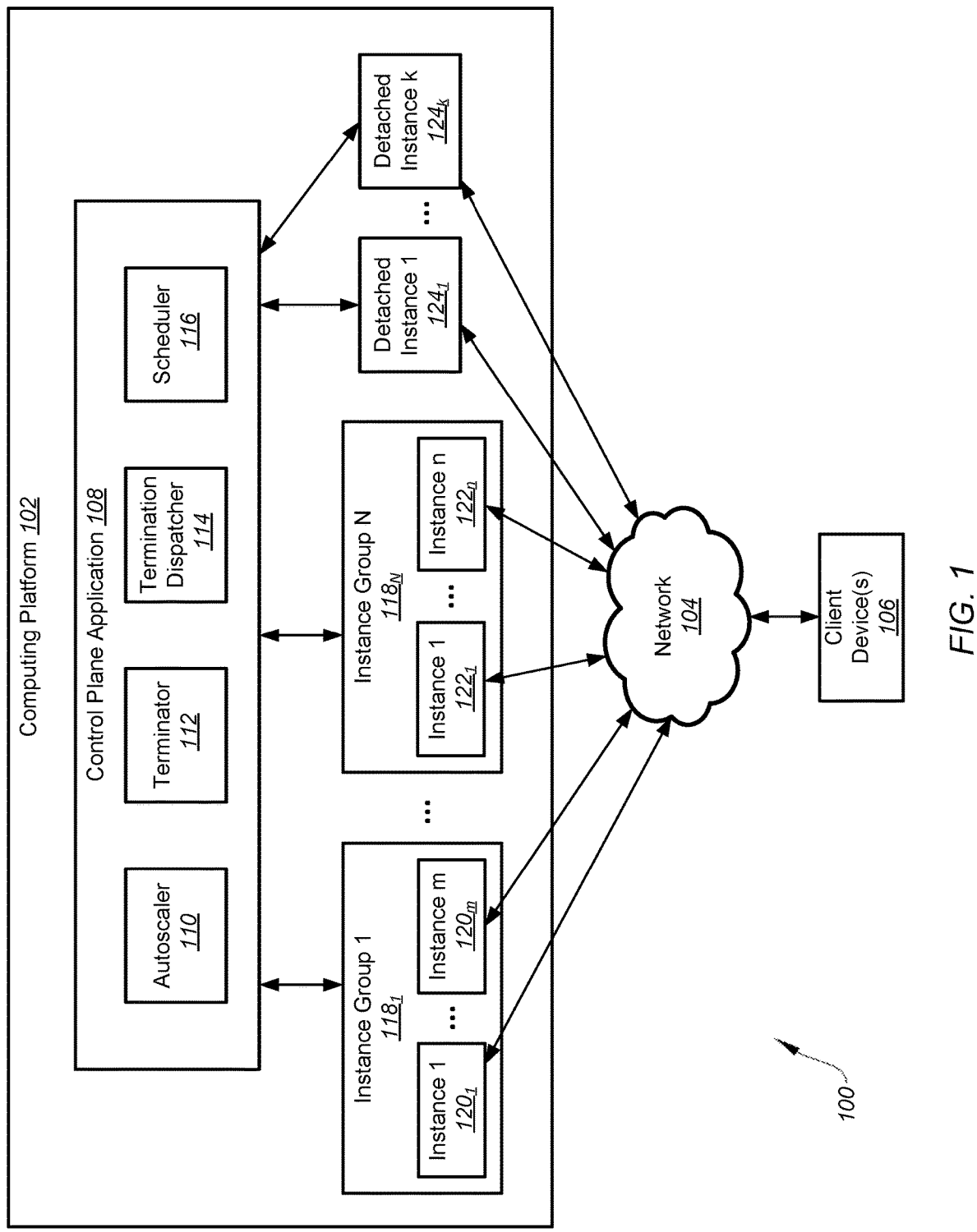
FIG. 1 is a simplified diagram showing a system for terminating instances and/or autoscaling instance groups of a computing platform according to one embodiment of the present invention.

FIG. 1 is a simplified diagram showing a system 100 for terminating instances and/or autoscaling instance groups of a computing platform 102 according to one embodiment of the present invention. This diagram is merely an example, which should not unduly limit the scope of the claims. One of ordinary skill in the art would recognize many variations, alternatives, and modifications. The system 100 includes the computing platform 102, a network 104, and one or more client devices 106. In some examples, the computing platform 102 includes a control plane application 108. For example, the control plane application 108 includes an autoscaler 110. As an example, the control plane application 108 includes a terminator 112 and a termination dispatcher 114. In one example, the control plane application 108 includes a scheduler 116.

According to some embodiments, instance groups $118_{1-N}$ represent instance groups $118_1, \ldots, 118_N$ as shown in FIG. 1, instances $120_{1-m}$ represent instances $120_1, \ldots, 120_m$ as shown in FIG. 1, instances $122_{1-n}$ represent instances $122_1, \ldots, 122_n$ as shown in FIG. 1, and instances $124_{1-k}$ represent instances $124_1, \ldots, 124_k$ as shown in FIG. 1. In certain examples, the computing platform includes one or more instance groups $118_{1-N}$. For example, each instance group $118_{1-N}$ is associated with one or more instances $120_{1-m}, \ldots, 122_{1-n}$, respectively. As an example, an instance is associated with only one instance group. In other examples, the computing platform includes one or more detached instances $124_{1-k}$ that are not associated with any instance group $118_{1-N}$.

In some embodiments, the computing platform 102 includes a cluster computing platform including one or more server or host machines. In some examples, the computing platform 102 includes a distributed computing platform that allows the one or more device clients 106 to distribute applications and/or data over the network 104 to a cluster of servers or host machines. In certain examples, the computing platform 102 includes a cloud computing platform that allows the one or more device clients 106 access to remote servers, data storages, networks, devices, applications and/or data resources over the network 104. For example, multiple users through the one or more client devices 106 store data at the data storages of the cloud computing platform. In other examples, the computing platform 102 is associated with a platform provider that provides the platform to multiple customers. For example, customers of the computing platform 102 include individuals, organizations and/or commercial companies.

In certain embodiments, the one or more servers or host machines are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region are isolated from any other zone within the region. In one example, each zone within a region is connected with any other zone within the region through low-latency links. In some examples, the computing platform 102 is configured to not replicate applications and/or resources across different regions. For example, each region is completely independent from any other region of the computing platform 102.

According to some embodiments, the computing platform 102 includes a container-orchestration platform. In some examples, the container-orchestration platform allows for automated deployment, scaling and/or operations of containers across the platform. For example, the container-orchestration platform employs the containers across one or more instances of the computing platform 102.

According to certain embodiments, a container of the computing platform 102 includes one or more applications. In some examples, the container also includes data and libraries associated with the one or more applications. For example, the container allows the one and more applications and their associated data and libraries to be co-located on the same server or host machine. In one example, the container allows the one and more applications and their associated data and libraries to share resources. For example, the shared resources include CPU, memory, storage, and/or networking capacity. As an example, the container represents the lowest level of a micro-service of the computing platform 102. In one example, the micro-service includes the one or more applications, libraries and the applications' dependencies.

In some embodiments, the scheduler 116 is configured to, in response to receiving an unscheduled pod from the one or more client devices 106, select one instance from the instances $120_{1-m}, 122_{1-n}$, of the computing platform 102 for running the unscheduled pod. For example, the scheduler 116 is configured to select the one instance based at least in part on the availability of resources associated with the selected instance. As an example, each instance group $118_{1-N}$ is assigned a minimum size of resources and a maximum size of resources. In some example, a pod of the computing platform 102 represents a basic scheduling unit of work on the computing platform 102. In certain examples, the pod includes one or more containers. In other examples, one or more pods of the computing platform 102 provide a service to the one or more client devices 106. In some examples, the scheduler 116 is configured to not schedule pods on any instances identified as unschedulable. In certain examples, the scheduler 116 is configured to monitor use of resources of each instance to ensure that workload is not scheduled in excess of available resources.

In certain embodiments, the scheduler 116 is configured to a new custom resource to the computing platform 102 called Demand. For example, Demand is an expression of a demand that could not be scheduled together. In some examples, the Demand includes: an instance group label that a demand is for; a list of demand units, e.g., a standard CPU resources, a standard memory resource, a count of discrete demand units; an owner reference that points to the job that caused the demand; and a status that includes: empty (the initial stage), pending (autoscaler has seen the demand), in-progress (autoscaler has started provisioning resources for the demand), fulfilled (autoscaler has satisfied the demand), and cannot fulfill (if a single demand unit exceeds what can be provided in a single instance group increment, i.e., the default instance size). In certain examples, the one or more client devices 106 are responsible for both creating a Demand resource and deleting the Demand resource. For example, in the case of a Spark scheduler, the scheduler 116 is configured to create a Demand resource per Spark job that the scheduler 116 fails to schedule due to a lack of resources. As an example, the Demand resource includes two demand units, one for the driver and a second one for all the executors. In some examples, at any point in time, a Demand resource can be deleted if the associated job has been scheduled. For example, it is possible that the autoscaler 110 already started the process of increasing capacity and the scale-down process is allowed to reclaim the potential excess capacity. As an example, once the additional capacity is online, the autoscaler 110 is configured to change the Demand resource to fulfilled. In one example, once the one or more client devices 106 are able to schedule a job, the autoscaler 110 is configured to delete the Demand resource associated with the job.

According to some embodiments, the terminator 112 of the computing platform 102 is configured to terminate an instance of the one or more instances $120_{1-m}$, $122_{1-n}$ associated with the instance groups $118_{1-N}$. In some examples, the autoscaler 110 and/or the scheduler 116 are configured to associate a new instance with the instance group of the terminated instance. For example, the terminated instance is replaced with a new instance in the instance group of the terminated instance. In certain examples, the terminator 112 is configured to terminate an instance in response to the instance being identified as eligible for termination. For example, the terminator 112 is configured to evaluate on a continuous basis whether an instance associated with an instance group is eligible for termination. In some examples of scaling up instance groups, the autoscaler 110 is configured to run bin packing, including the pods that were deemed unschedulable by the scheduler 116, and scale up the number of bins (instances) that the autoscaler 110 requires bin packing pods while respecting utilization targets and/or maximum job latency. In certain examples of scaling down instance groups, the autoscaler 110 is configured to periodically evaluate instances that are below utilization targets and attempt to terminate ones that are least impactful based on runtime and/or priority. In other examples, the autoscaler 110 is configured to scale down instance groups in the least destructive way possible, initially preferring to allow all pods to exit gracefully at the cost of utilization over pre-empting pods before the pods run to completion to increase efficiency.

According to certain embodiments, the terminator 112 is configured to identify an instance of an instance group as eligible for termination in response to the instance meeting one or more predetermined eligibility conditions. For example, the predetermined eligibility conditions allow for flexibility regarding termination of particular instances. In some examples, the one or more predetermined eligibility conditions include the condition that a software upgrade is provided by the computing platform 102 for the instance and/or the instance group. In certain examples, the one or more predetermined eligibility conditions include the condition that a runtime of the instance is equal to or larger than a predetermined maximum lifetime. For example, the runtime of the instance represents a period of time when the instance is running and that starts at a time when the instance is launched. In other examples, the one or more predetermined eligibility conditions include the condition that the instance $124_{1-k}$ is detached from any instance group $118_{1-N}$ of the computing platform 102. In yet other examples, the one or more predetermined eligibility conditions include the condition that the runtime of the instance is larger than a predetermined minimum lifetime.

In some embodiments, the terminator 112 is configured to identify an instance of an instance group as eligible for termination if the terminator 112 determines that the computing platform 102 provides a software upgrade for the instance and/or the instance group associated with the instance. For examples, the software upgrade includes a critical upgrade and/or a non-critical upgrade for the instance and/or the instance group. As an example, a critical upgrade includes an upgrade required to be applied to the instance and/or the instance group before the planned end-of-life of the instance. In one example, a critical upgrade includes an upgrade having security remediations for the instance, the instance group, and/or the computing platform 102. In certain examples, the terminator 112 is configured to identify an instance as eligible for termination only if the software upgrade of the instance is determined to be critical. In other examples, the terminator 112 is configured to identify an instance as eligible for termination if the software upgrade of the instance and/or the instance group associated with the instance is determined to be safe. For example, a software upgrade is determined to be safe if upgrading does not disrupt or negatively affect the operation of the instance and/or the instance group. In some examples, the terminator 112 is configured to identify an instance as eligible for termination if the software upgrade is related to an infrastructure upgrade of the instance group associated with the instance.

In some examples, the terminator 112 is configured to determine that the computing platform 102 provides a software upgrade for the instance and/or the instance group if a version number of the provided upgrade differs from a version number associated with the instance group. For example, each instance group $118_{1-N}$ and the instances $120_{1-m}$, $122_{1-n}$ of each instance group $118_{1-N}$ are associated with a particular version number, respectively. As an example, the terminator 112 is configured to determine that a software upgrade is provided for the instance and/or the instance group if the provided upgrade includes a higher version number than the version number associated with the instance and/or the instance group.

In certain embodiments, the terminator 112 is configured to identify an instance of an instance group as eligible for termination if the terminator 112 determines that the runtime of the instance is equal to or larger than a predetermined maximum lifetime. For example, the predetermined maximum lifetime is equal to 72 hours. As an example, the predetermined maximum lifetime is equal to 5 hours. In one example, the predetermined maximum lifetime is equal to 6 hours, 12 hours, 18 hours, 24 hours, 30 hours, 36 hours, 42 hours, 48 hours, 54 hours, 60 hours, or 66 hours. For examples, the predetermined maximum lifetime represents a particular time period that is within a range from 5 hours to 72 hours. In some examples, the predetermined maximum lifetime for each instance of the computing platform 102 is the same. In certain examples, the terminator 112 is configured to immediately terminate each instance including runtimes that are equal to or larger than the predetermined maximum lifetime to improve security and resiliency of the computing platform 102. For example, the terminator 112 is configured to terminate all instances including runtimes that are equal to or larger than the predetermined maximum lifetime regardless of the instances' operating condition at the time of termination. As an example, the terminator 112 is configured to ensure that no instance continuously operates for a runtime exceeding the predetermined maximum lifetime.

According to some embodiments, the terminator 112 is configured to identify an instance of an instance group as eligible for termination if the terminator 112 determines that the instance is not associated with the instance groups $118_{1-N}$ of the computing platform 102. For example, the instance is not associated with any instance group $118_{1-N}$ in response to the instance being detached from the instance group associated with the instance. As an example, the detached instance $124_{1-k}$ is still running on the computing platform 102. In one example, the detached instance $124_{1-k}$ runs to completion while being managed by the computing platform 102. In some examples, the scheduler 116 is configured to, in response to an instance being detached from the instance group, prepare a new instance as operational and to associate the new operational instance with the instance group of the detached instance. For example, preparation of the new instance includes associating a version number with the new instance. As an example, the version number of the new instance and a version number of the instance group associated with the new instance are the same.

According to certain embodiments, the terminator 112 is configured to identify an instance of an instance group as eligible for termination if the runtime of the instance is larger than a predetermined minimum lifetime. For example, the predetermined minimum lifetime is equal to 40 hours. As an example, the predetermined minimum lifetime is equal to 2 hours. In one example, the predetermined minimum lifetime is equal to 4 hours, 10 hours, 16 hours, 22 hours, 28 hours, or 34 hours. For examples, the predetermined minimum lifetime represents a particular time period that is within a range from 2 hours to 40 hours. In some examples, the predetermined minimum lifetime for each instance of the computing platform is the same. In certain examples, the predetermined minimum lifetime is smaller than the predetermined maximum lifetime.

In some embodiments, the terminator 112 is configured to identify the instance as eligible for termination with a predetermined probability. In some examples, the predetermined probability for each instance of the computing platform 102 is the same. For example, the predetermined probability represents a probability that is within the range from 0% to 100%. In certain examples, the predetermined probability is equal to 0% if the runtime of the instance is smaller than a predetermined minimum lifetime. For example, the predetermined minimum lifetime is equal to 40 hours. As an example, the predetermined minimum lifetime is equal to 2 hours. In one example, the predetermined minimum lifetime is equal to 4 hours, 10 hours, 16 hours, 22 hours, 28 hours, or 34 hours. For examples, the predetermined minimum lifetime represents a particular time period that is within a range from 2 hours to 40 hours. In some examples, the predetermined minimum lifetime for each instance of the computing platform is the same. In certain examples, the predetermined minimum lifetime is smaller than the predetermined maximum lifetime.

In certain embodiments, the predetermined probability increases from 0% at the predetermined minimum lifetime to about 100% at a predetermined natural lifetime. In some examples, the predetermined probability is equal to 100% at the predetermined natural lifetime. As an example, a natural lifetime of an instance represents a period of time that starts when the instance is launched and ends when the instance is expected to naturally run to completion. For example, the predetermined natural lifetime is equal to 48 hours. As an example, the predetermined natural lifetime is equal to 3 hours. In one example, the predetermined natural lifetime is equal to 8 hours, 14 hours, 20 hours, 26 hours, 34 hours, or 40 hours. For examples, the predetermined natural lifetime represents a particular time period that is within a range from 3 hours to 48 hours. In some examples, the predetermined natural lifetime for each instance of the computing platform is the same. In certain examples, the predetermined natural lifetime is smaller than the predetermined maximum lifetime. In other examples, the predetermined natural lifetime is equal to or larger than the predetermined minimum lifetime. In yet other examples, the predetermined natural lifetime and the predetermined maximum lifetime are the same.

According to some embodiments, the predetermined probability is equal to about 100% if the runtime of the instance is larger than the predetermined natural lifetime. In some examples, the predetermined probability is equal to 100% if the runtime of the instance is larger than the predetermined natural lifetime. In certain examples, the predetermined natural lifetime is different for each instance of the computing platform 102. For example, the predetermined natural lifetimes for all instances of the computing platform 102 are different and fall within in a 10-minute range of a 48-hour lifetime. In some examples, each instance $120_{1-m}$, $122_{1-n}$, of the computing platform 102 is associated with a predetermined minimum lifetime, a predetermined natural lifetime, and a predetermined maximum lifetime. In other examples, the terminator 112 is configured to identify all instances $120_{1-m}$, $122_{1-n}$ of the computing platform 102 as eligible for termination if the runtime of each instance $120_{1-m}$, $122_{1-n}$ exceeds the predetermined natural lifetime of the instance.

In some embodiments, the terminator 112 is configured to identify an instance of an instance group as ineligible for termination if the instance is associated with a "pause" label. For example, a user of the computing platform 102 manually labels the instance "pause" through a console of the computing platform 102. In some examples, the terminator 112 is configured to identify an instance as eligible for termination only if the instance is not associated with the "pause"

label. In certain examples, all "pause"-labeled instances are ineligible for termination until the label is removed.

In certain embodiments, the terminator 112 is configured to terminate an instance in response to determining that the instance is eligible for termination. In some examples, the terminator 112 is configured to identify the termination-eligible instance as unschedulable. For example, the scheduler 118 is configured to not schedule pods on any instances identified as unschedulable. In certain examples, the terminator 112 is configured to identify an instance of an instance group as ineligible for termination only for one zone of a plurality of zones associated with the instance group. For example, each instance group $120_{1-m}$, $122_{1-n}$ of the computing platform 102 is associated with three zones.

Figure 2:
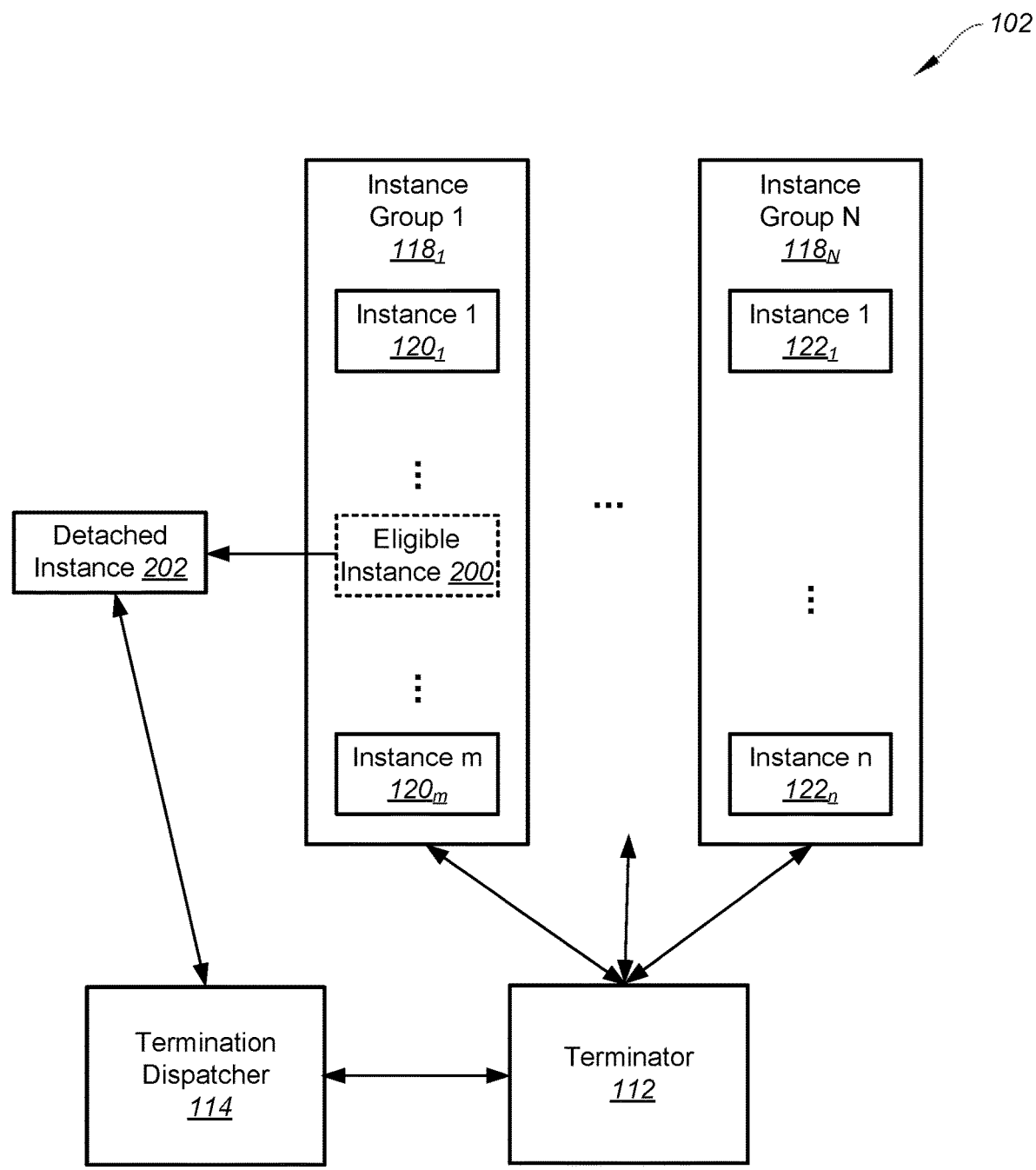
FIG. 2 is a simplified diagram showing the computing platform as part of the system for terminating instances as shown in FIG. 1 according to one embodiment of the present invention.

FIG. 2 is a simplified diagram showing the computing platform 102 as part of the system 100 for terminating instances as shown in FIG. 1 according to one embodiment of the present invention. This diagram is merely an example, which should not unduly limit the scope of the claims. One of ordinary skill in the art would recognize many variations, alternatives, and modifications. In some examples, the terminator 112 is configured to detach the termination-eligible instance 200 from the instance group $118_1$ to create the detached instance 202. For example, detaching the termination-eligible instance 200 from the instance group $118_1$ allows a new instance to be associated with the instance group $118_1$. In certain examples, the terminator 112 is configured to wait for the new instance to be associated with the instance group $118_1$. For example, the terminator 112 is configured to wait for the new instance to be associated with the instance group $118_1$ prior to the detached instance 202 being terminated. As an example, waiting for the new instance to be associated with the instance group $118_1$ prior to the detached instance 202 being terminated allows the instance group $118_1$ to continue operating at a constant capacity. In another example, waiting for the new instance to be associated with the instance group $118_1$ prior to the detached instance 202 being terminated allows the instance group $118_1$ to continue operating at close to full capacity. In other examples, the terminator 112 is configured to send the detached instance 202 to the termination dispatcher 114.

In some embodiments, the termination dispatcher 114 is configured to terminate the detached instance 202. For example, the termination dispatcher 114 is configured to maintain a queue of instances to be terminated. As an example, the termination dispatcher 114 is configured to receive the first instance from the queue and terminate the received instance. In one example, the detached instance 202 is the first instance received from the queue to be terminated by the termination dispatcher 114. In some examples, the termination dispatcher 114 is configured to immediately terminate the detached instance 202 if the runtime of the detached instance 202 is equal to or larger than the predetermined maximum lifetime. For example, the predetermined maximum lifetime is equal to 72 hours. As an example, the predetermined maximum lifetime is equal to 5 hours. In one example, the predetermined maximum lifetime is equal to 6 hours, 12 hours, 18 hours, 24 hours, 30 hours, 36 hours, 42 hours, 48 hours, 54 hours, 60 hours, or 66 hours. For examples, the predetermined maximum lifetime represents a particular time period that is within a range from 5 hours to 72 hours. In some examples, the predetermined maximum lifetime for each instance of the computing platform 102 is the same. In certain examples, the termination dispatcher 114 is configured to terminate the detached instance 202 based on a set of predetermined termination rules to allow flexibility as to whether to terminate the detached instance 202.

In certain embodiments, the termination dispatcher 114 is configured to evict each pod associated with the detached instance 202 prior to terminating the detached instance 202. In some examples, the evicting a pod by the termination dispatcher 114 includes gracefully evicting the pod from the instance associated with the pod. For example, the termination dispatcher 114 is configured to not immediately kill each container of the pods associated with the detached instance 202. In one example, gracefully evicting the pod prevents the work associated with the pod to be rescheduled by the scheduler 116. As an example, gracefully evicting a pod by the termination dispatcher 114 includes the termination dispatcher 114 starting a predetermined grace period and allowing the containers of the pod to run to completion and perform cleanup functions during the predetermined grace period. In one example, the termination dispatcher 114 is configured to kill the containers of the pod if the predetermined grace period of the pod is expired.

According to some embodiments, the evicting a pod by the termination dispatcher 114 includes respecting a predetermined health condition of the one or more services provided by the pod. For example, the predetermined health condition of a service includes a predetermined maximum number of disruptions related to the service. In one example, the disruptions include voluntary failures and/or voluntary disruptions. In another example, the disruptions include simultaneous failures and/or simultaneous disruptions. In certain examples, the respecting the predetermined health condition of a service includes limiting a number of failures and/or disruptions related to the service to a value that is smaller than the predetermined maximum number of disruptions. In one example, the termination dispatcher 114 is configured to evict a pod associated with the detached instance 202 if the pod is non-deferring. For example, a pod running and performing work on an instance represents a deferring pod. In another example, the termination dispatcher 114 is configured to evict a pod associated with the detached instance 202 if evicting the pod does not result in one or more services provided by the evicted pod losing quorum. For example, a pod loses quorum if the number of running replicas of the pod's quorum-based containers and/or quorum-based applications decreases below a value needed for a quorum. In yet another example, the termination dispatcher 114 is configured to evict a pod associated with the detached instance 202 if evicting the pod does not result in a number of running replicas of a pod's load-serving container or application decreasing below a predetermined percentage of the total load related to the load-serving container or application.

According to certain embodiments, the termination dispatcher 114 is configured to terminate the detached instance 202 if each pod associated with the detached instance 202 is evicted. In some examples, the termination dispatcher 114 is configured to immediately terminate the detached instance 202 if the runtime of the detached instance 202 is equal to or larger than the predetermined maximum lifetime without first evicting each pod associated with the detached instance 202. In certain examples, the termination dispatcher 114 is configured to not terminate the detached instance 202 if the detached instance 202 includes a deferring pod, or if terminating the detached instance 202 results in one or more services provided by the pods associated with the detached instance 202 losing quorum. In certain examples, the termination dispatcher 114 is configured to not terminate the detached instance 202 if one or more pods associated with the detached instance 202 are not evicted. For example, the termination dispatcher 114 is configured to send the detached instance 202 to the end of the queue of instances to be terminated so that the pods still associated with the detached instance 202 are evicted at a later time.

In some embodiments, the termination dispatcher 114 is configured to, in response to satisfying one or more predetermined termination conditions, terminate instances associated with an instance group. In some examples, the satisfying one or more predetermined termination conditions includes terminating the instances on a per instance group basis, in parallel for each instance group $118_{1-N}$ of the computing platform 102, and/or asynchronously for each instance group $118_{1-N}$ of the computing platform 102. In certain examples, the satisfying one or more predetermined termination conditions includes terminating one instance associated with one instance group at a time. In other examples, the satisfying one or more predetermined termination conditions includes terminating a number of instances associated with the instance group at the same time with the number not exceeding a predetermined termination maximum. In yet other examples, the satisfying one or more predetermined termination conditions includes terminating related instances that are associated with different instance groups.

In certain embodiments, the terminator 112 is configured to monitor one or more termination characteristics. In some examples, the monitored termination characteristics include the termination eligibility of each instance and reasons for each instance being identified as termination eligible or termination ineligible. Other examples of monitored termination characteristics include the time of each terminated instance from when the instance was identified as eligible for termination until termination of the instance and the time for individual stages of the termination process for each instance. Additional examples of monitored termination characteristics include errors encountered when determining termination eligibility of an instance, failures to evict pods, eviction times exceeding a particular threshold, failures to detach an instance, failures to receive a new instance replacing a detached instance, replacement times exceeding a particular threshold, and/or instances that live beyond their predetermined natural lifetime.

Figure 3:
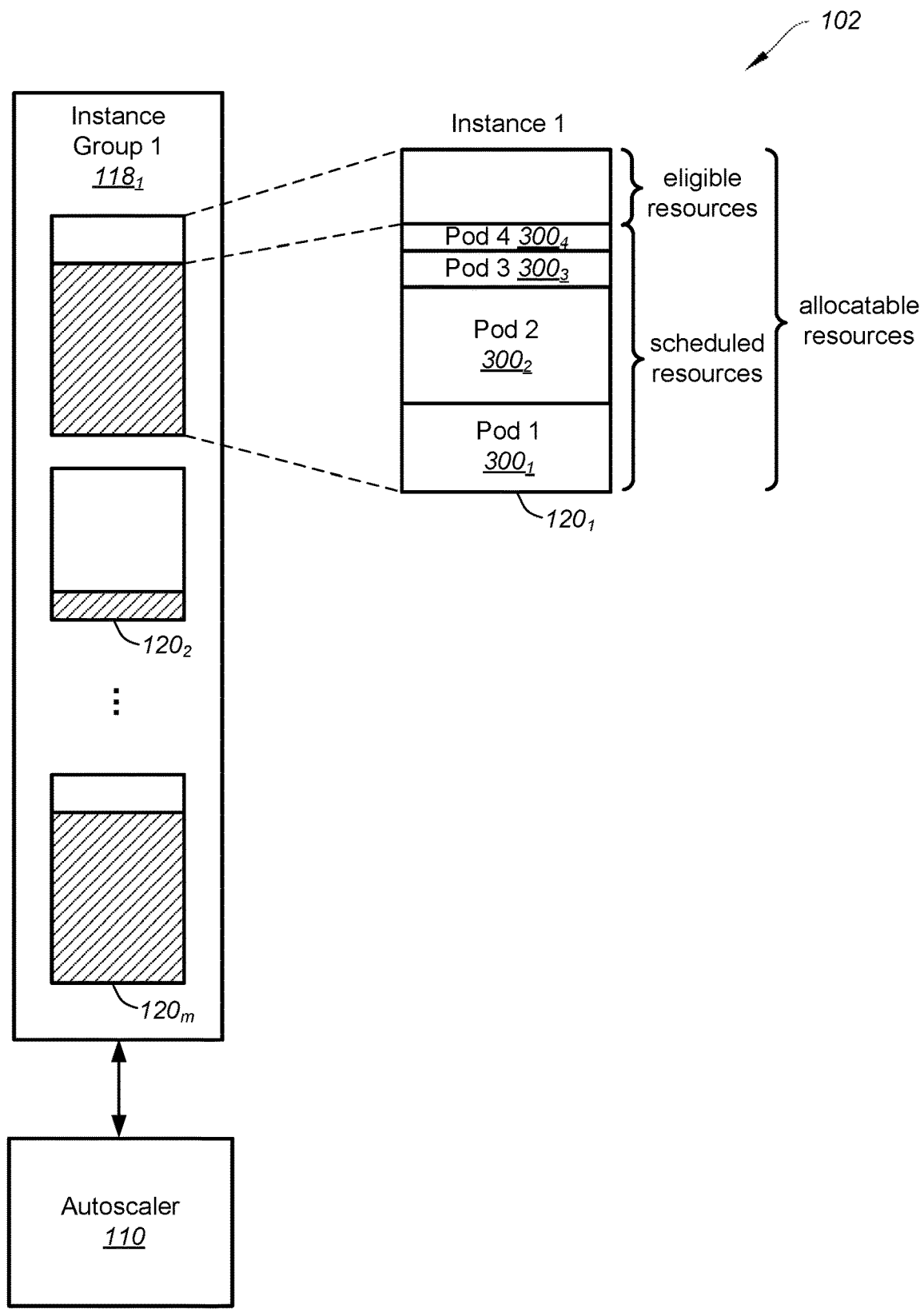
FIG. 3 is a simplified diagram showing the computing platform as part of the system for autoscaling instance groups as shown in FIG. 1 according to one embodiment of the present invention.

FIG. 3 is a simplified diagram showing the computing platform 102 as part of the system 100 for autoscaling instance groups as shown in FIG. 1 according to one embodiment of the present invention. This diagram is merely an example, which should not unduly limit the scope of the claims. One of ordinary skill in the art would recognize many variations, alternatives, and modifications. Referring to FIG. 1, in some examples, the autoscaler 110 is configured to independently autoscale each instance group $118_{1-N}$ of the computing platform 102. In certain examples, the autoscaler 110 is configured to autoscale each instance group $118_{1-N}$ of the computing platform 102 on a per instance group basis, in parallel for each instance group $118_{1-N}$ of the computing platform 102, and/or asynchronously for each instance group $118_{1-N}$ of the computing platform 102. Referring to FIG. 3, in other examples, the autoscaling of the instance group $118_1$ by the autoscaler 110 includes scaling up or scaling down the instance group $118_1$. In yet other examples, the autoscaler 110 is configured to independently scale up or scale down the instance group $118_1$ of the computing platform 102.

In some embodiments, the autoscaler 110 is configured to allow for one or more configuration options including: for each instance group, instance group name to resource channel name mapping that acts as a white list for which the instance groups can be scaled up and/or scaled down; global defaults (which can be overridden on a per instance group basis); and, optional, per instance group overrides for each global default. For example, the global defaults include a predetermined scale-up threshold as a percentage of allocatable units (resources provided with the default instance type): CPU equal to a sum of resource CPU requests divided by instance's allocatable CPU; and MEM equal to a sum of resource memory requests divided by instance's allocatable memory. As an example, the global defaults include a predetermined scale-down threshold as a percentage of allocatable units (resources provided with the default instance type): CPU equal to a sum of resource CPU requests divided by instance's allocatable CPU; and MEM equal to a sum of resource memory requests divided by instance's allocatable memory. In one example, the global defaults include a maximum pending threshold (duration) that represents a predetermined maximum time, which the oldest demand resource can be kept waiting for before scaling up, which is independent of the predetermined scale-up threshold and the predetermined scale-down threshold, and which ensures that a single demand resource does not wait for too long if there are no more incoming jobs. In another example, the global defaults include a scale-down cool-off timer threshold (duration) that represents a predetermined minimum time to wait between increasing the capacity for an instance group and evaluating the instance group for scaling down.

In certain embodiments, the autoscaler 110 is configured to scale up the instance group $118_1$ of the computing platform 102. In some examples, the instance group $118_1$ is associated with a desired instance number. For example, the desired instance number is equal to a value based at least in part on the minimum size of resources and/or the maximum size of resources assigned to the instance group $118_1$. In one example, the desired instance number is equal to an actual number of instances $120_{1-m}$ associated with the instance group $118_1$. In certain examples, the autoscaler 110 is configured to receive a request from the scheduler 116 to schedule one or more schedulable pods on instances associated with the instance group $118_1$. In one example, the one or more schedulable pods include all the work to be scheduled on the computing platform 102 at a particular time. In other examples, the autoscaler 110 is configured to, in response to receiving the request from the scheduler 116 to schedule the one or more schedulable pods on instances associated with the instance group $118_1$, determine a sum equal to demanded resources for the one or more schedulable pods plus scheduled resources of the instance group $118_1$. For example, the demanded resources include resources required by the one or more schedulable pods to be scheduled on instances associated with instance group $118_1$. As an example, the scheduled resources of the instance group $118_1$ are equal to a sum of all resources allocated to one or more pods associated with each instance $120_{1-m}$ of the instance group $118_1$. In one example, the scheduled resources of the instance $120_1$ are equal to a sum of all resources allocated to the pods $300_{1-4}$.

According to some embodiments, the autoscaler 110 is configured to determine a number of new instances associated with the instance group $118_1$ based at least in part on the sum equal to the demanded resources for the one or more schedulable pods plus the scheduled resources of the instance group $118_1$. In some examples, the autoscaler 110 is configured to determine the number of new instances associated with the instance group $118_1$ by bin packing the one or more schedulable pods into the instances $120_{1-m}$ of the instance group $118_1$. For example, the autoscaler 110 is configured to increase the number of new instances if the autoscaler 110 is unable to schedule the one or more schedulable pods on the existing instances $120_{1-m}$ by bin packing the one or more schedulable pods into the existing instances $120_{1-m}$. In certain examples, the autoscaler 110 is configured to not increase the number of new instances if the autoscaler 110 is able to schedule the one or more schedulable pods on instances of the instance group $118_1$ identified as unschedulable. For example, the autoscaler 110 is configured to preferably schedule the one or more schedulable pods on younger instances of the instance group $118_1$ identified as unschedulable. As an example, an instance is younger than another instance if the runtime of the instance is shorter than the runtime of the other instance. In certain examples, the number of new instances associated with the instance group $118_1$ determined by the autoscaler 110 changes based on a type of the demanded resources for the one or more schedulable pods. Examples of resource types include CPU resources or memory resources. In other examples, the autoscaler 110 is configured to determine the number of new instances being equal to the largest number of new instances determined based on two or more types of the demanded resources for the one or more schedulable pods. For example, if, by bin picking, the autoscaler 110 determines two different numbers of new instances for CPU resources and memory resources, respectively, the autoscaler 110 determines the number of new instances being equal to the larger for the two numbers to ensure that the one or more schedulable pods fit into the new instances.

According to certain embodiments, the autoscaler 110 is configured to evaluate an average utilization percentage of the instance group $118_1$. In some examples, the average utilization percentage of the instance group $118_1$ is equal to the sum equal to the demanded resources for the one or more schedulable pods plus the scheduled resources of the instance group $118_1$ divided by a sum equal to allocatable resources of the instance group $118_1$ plus allocatable resources of the new instances. For example, the allocatable resources of an instance represents a predetermined maximum of resources associated with the instance. As an example, the allocatable resources of the instance group $118_1$ is equal to a sum of the allocatable resources of each instance $120_{1-m}$ associated with instance group $118_1$. In certain examples, the average utilization percentage of the instance group $118_1$ is equal to an average of the utilization percentage for each instance $120_{1-m}$ associated with instance group $118_1$. For example, the utilization percentage of an instance is equal to the scheduled resources of the instance divided by the allocatable resources of the instance. In other examples, the autoscaler 110 is configured to determine the average utilization percentage of the instance group $118_1$ based on the type of demanded resources for the one or more schedulable pods. For example, the average utilization percentage changes based on the type of demanded resources.

In some embodiments, the autoscaler 110 is configured to increase the desired instance number of the instance group $118_1$ by the determined number of new instances if the average utilization is larger than a predetermined scale-up threshold. In some examples, the autoscaler 110 is configured to increase the desired instance number of the instance group $118_1$ by the determined number of new instances if the average utilization for at least one type of demanded resources is larger than the predetermined scale-up threshold of the at least one type of demanded resources. For example, the autoscaler 110 is configured to increase the desired instance number by the determined number of new instances if the average utilization for either CPU resources or memory resources exceeds the corresponding predetermined scale-up threshold, respectively. In certain examples, the autoscaler 110 is configured to change the desired instance number of the instance group $118_1$ to the predetermined maximum instance number associated with the instance group if the desired instance number exceeds the predetermined maximum instance number.

In certain embodiments, the autoscaler 110 is configured to increase the desired instance number of the instance group $118_1$ by the determined number of new instances if a duration for which the request to schedule the one or more schedulable pods is pending exceeds a maximum pending threshold, and if the request is the oldest request received by the autoscaler 110. For example, increasing the desired instance number if the duration for which the oldest request is pending exceeds a maximum threshold allows scheduling the one or more schedulable pods associated the request if no other request have been received by the autoscaler 110. In certain examples, the autoscaler 110 is configured to increase the desired instance number of the instance group $118_1$ by the determined number of new instances if a duration for which the request to schedule the one or more schedulable pods is pending exceeds a maximum pending threshold, and if the average utilization is not larger than a predetermined scale-up threshold.

According to some embodiments, the autoscaler 110 is configured to scale up the instance group $118_1$ by incrementing the desired instance number and then waiting for the instance to become available. In some examples, the autoscaler 110 is configured to perform health checks of an instance group that indicate failures like the instance group reaching a predetermined maximum instance number, a zone associated with the instance group being out of capacity, and/or account wide instance type limits.

According to certain embodiments, the autoscaler 110 is configured to scale down the instance group $118_1$ of the computing platform 102. In some examples, the autoscaler 110 is configured to determine whether a utilization percentage of an instance associated with an instance group is smaller than a predetermined scale-down threshold. For example, the utilization percentage of an instance is equal to the scheduled resources of the instance divided by the allocatable resources of the instance. In certain examples, the autoscaler 110 is configured to, in response to determining that the utilization percentage of the instance is smaller than the predetermined scale-down threshold, identify the instance as unschedulable. In other examples, the autoscaler 110 is configured to wait for each running pod associated with the identified instance to run to completion. In yet other examples, the autoscaler 110 is configured to, in response to each running pod associated with the identified instance running to completion, detach the identified instance from the instance group $118_1$. In some examples, the autoscaler 110 is configured to, in response to detaching the identified instance from the instance group $118_1$, decrease the desired instance number associated with the instance group $118_1$ by one. In certain examples, the autoscaler 110 is configured to identify the detached instance as eligible for termination and send the detached instance to the termination dispatcher 114 for termination.

In some embodiments, the autoscaler 110 is configured to evaluate scaling down decisions within the context of a single instance group. For example, all instance groups that the autoscaler 110 is configured to manage are evaluated in parallel and asynchronously by the autoscaler 110. In some examples, a decision of the autoscaler 110 to scale down is triggered by the following. For example, a cool-down timer is used to allow time for new jobs to be scheduled on an existing capacity before being scaled down. As an example, the duration of the timer is defined via the configuration of the autoscaler 110 and defaults to 120 seconds. In one example, the cool-down timer must expire prior to the autoscaler's 110 evaluation of excess capacity to occur. In certain examples, any time the autoscaler 110 determines to bring up new instances as part of scaling up an instance group, the cool-down timer is reset for the corresponding instance group. In other examples, the autoscaler 110 is configured to not scale down if there are existing unfulfilled demand resources for the instance group. In some examples, once the cool-down time expires, the autoscaler 110 is configured to evaluate all nodes within the instance group for eligibility to be scaled down, using the following criteria: (1) instances are sorted based on free allocatable capacity, from the largest free allocatable capacity to least free allocatable capacity, for both memory and CPU (e.g., "free allocatable capacity" is determined by the autoscaler 110 taking the instance's allocatable resources for memory or CPU and subtracting a sum of container memory resource requests or container CPU resources requests, respectively); and (2) instances are filtered to only those in which the utilization of both memory and CPU are under the predetermined scale-down threshold.

In certain embodiments, the autoscaler 110 is configured to mark the instances running on the filtered set of instances as "unschedulable" in batches of configurable size (1 . . . len (instance group)). In some examples, the batch size allows to tune the aggressiveness of scaling down the instance group. In certain examples, the autoscaler 110 is configured to mark one instance at a time as "unschedulable". In other examples, the autoscaler 110 is configured to monitor the instances that have been marked "unschedulable" as a background process and wait for all the running pods on each instance to exit. For example, the autoscaler 110 is configured to, once all the non-control plane pods on an instance have exited, to detach and decrement the desired instance number of the corresponding instance group. In certain examples, the terminator 112 is configured to actually decommission and terminate the instance. For example, the terminator 112 is configured to not terminate instances marked as "unschedulable" and terminate detached instances.

In one example, the computing platform includes five instances with each instance having a maximum capacity of 10 resource units (RU). In this example, the predetermined scale-down threshold is equal to 75%, instance 1 is running 8 RU, instance 2 is running 9 RU, instance 3 is running 1 RU, and instance 4 is running 4 RU. Since instance 3 and instance 4 in this example are below the scale down utilization thresholds, the autoscaler 110 is configured to mark these instances as "unschedulable" and wait for the pods running on these instances to finish. In this example, if the pod on instance 3 exits at this point, the autoscaler 110 is configured to notice the pod existing, detach the instance from the instance group, and decrement the desired instance number of the instance group size. In this example, the terminator 112 is configured to terminate the detached instance, and the autoscaler 110 is configured to, if a new demand resource has been created that requires 2×3 RU and since instance 4 is still marked as "unschedulable", use instance 3 to accommodate the new demand. In another example, since the entire demand can be accommodated on instance 4 (which is only been using 4 RU), the autoscaler 110 is configured to simply mark instance 4 as "schedulable" and mark the demand as "fulfilled."

In another examples, if the autoscaler 110 increases the capacity of an instance group in response to a demand object, but the new capacity is used for another job, the autoscaler 110 is configured to mark the demand resource as "fulfilled" and the scheduler 116 is configured to, on noticing that despite the demand being "fulfilled" and being unable to schedule the job, reset the demand to the empty status so that the autoscaler 110 reconsiders the demand.

In yet another example, the scheduler 116 creates a first demand for 5×1×1 RU. In this example, the autoscaler 110 acknowledges the demand and increases capacity by 1×16×16 RU. In this example, between when instance group's desired instance number is increased by the autoscaler 110 and before the corresponding new instance comes online, the scheduler 116 creates a new second demand for 5×1×1 RU for another job. In this example, the autoscaler's 110 bin packing indicates that no additional bins are required to schedule the second demand, and the autoscaler 110 is configured to mark the status of the second demand as "fulfilled" and wait for the scheduler 116 to schedule the job and remove the second demand.

According to some embodiments, a decision of the autoscaler 110 to scale down is triggered by the following. For example, a cool-down timer is used allow for time for new jobs to be scheduled on the existing capacity before being scaled down. In one example, the duration of the timer is defined via the configuration of the autoscaler 110. In some examples, the cool-down timer expires prior to the autoscaler 110 evaluating excess capacity. For example, any time a new demand resource is created, the cool-down timer is reset for the corresponding instance group. As an example, the autoscaler 110 is configured to not scale down an instance group if there are existing demand resources for the instance group. In certain examples, the autoscaler 110 is configured, once the cool-down time expires, to evaluate all instances within the instance group for eligibility to be scaled down, using the following criteria: (1) instances are sorted based on free allocatable capacity, from the largest free allocatable capacity to least free allocatable capacity, for both memory and CPU (e.g., "free allocatable capacity" is determined by the autoscaler 110 taking the instance's allocatable resources for memory or CPU and subtracting a sum of container memory resource requests or container CPU resources requests, respectively); and (2) instances are filtered to only those in which the utilization of both memory and CPU are under the predetermined scale-down threshold.

According to certain embodiments, the autoscaler 110 is configured to, of the eligible instances to be scaled down, select one instance at a time based on the following: (1) the sum of the priority field of all pods currently scheduled on an instance is computed to attempt to minimize the impact to higher priority pods running across instance; (2) instances are sorted based on the sum of the priority, smallest to largest; and (3) ties are broken by using the creation time of the instance, preferring an older instance over a younger instance. In some examples, the autoscaler 110 is configured to scale down one instance per instance group at a time, until no remaining instances that meet the criteria, or the cool-down timer is reset. In certain examples, the autoscaler 110 is configured to scale-down instances of an instance group by: (1) marking the selected instance as unschedulable; (2) detach the selected instance and decrement the desired instance number of the instance group in a one atomic operation; (3) relying on the terminator 112 to actually decommission and terminate the detached instance by draining the pods from the instance and eventually forcefully terminate the instance. In other examples, the autoscaler 110 is configured to not continue to the next eligible instance to scale-down, until all pods have been evicted off the prior instance and no unscheduled pods are assigned to the instance group.

In some embodiments, the autoscaler 110 is configured to, once the cool-down time expires, to evaluate all instance within an instance group for eligibility to be scaled down, using the criteria that instances are filtered to only those instances in which the utilization of both CPU and memory are under the predetermined scale-down threshold. In some examples, the autoscaler 110 is configured to further filter out any instances with deferring pods. For examples, the autoscaler 110 is configured to attempt and move capacity to deferring instances from other instance with the deferring instances including pods that are not to be killed. In certain examples, the autoscaler 110 is configured to order the filtered instances based on the following: (1) the sum of the priority field of all pods currently scheduled on an instances is computed, lower priority first, to attempt to minimize the impact to higher priority pods running across instances; and (2) ties are broken by using the creation time of the instance, preferring an older instance over a younger instance. In other examples, the autoscaler 110 is configured to, starting from the first instance in the ordered list of instances, to bin pack pods of the first instance onto other instances of the computing platform 102. For example, an instance is considered scale-down-able by the autoscaler 110, if all pods of the instance are bin packable onto other instance of the computing platform 102. In some examples, the autoscaler 110 is configured to continue this process until there are no more instances left in the ordered list or until no more instances can be removed. For example, some instances might still be below the predetermined utilization threshold targets after this process is completed due to their workload not being schedulable on other instances of the computing platform 102. In yet another example, it is likely that the instances towards the end of the ordered list, i.e., the instances with higher priorities, are the ones that most of the workload is shifted to. In this example, the autoscaler 110 is configured to not wait for an instance to actually terminate before moving on in the ordered list of instances eligible for scale down.

In certain embodiments, the autoscaler 110 is configured to monitor the following metrics to track its efficiency and impact: (1) percentage of available CPU or memory allocated by the computing platform 102; (2) the time from an instance group "scale up" call to an instance being schedulable; (3) the time from an instance group "scale down" call to an instance being terminated; (4) the number of pods being evicted if an instance group is scaled down; (5) the time that an demand exist before being filled; (6) the time that excess capacity exist before being removed; (7) the length of the demand queue, e.g., sum(len(demand units)); and the size of the demand queue in terms of CPU, e.g., sum(CPU in each demand unit), and/or in terms of memory, e.g., sum(memory in each demand unit).

Figure 4:
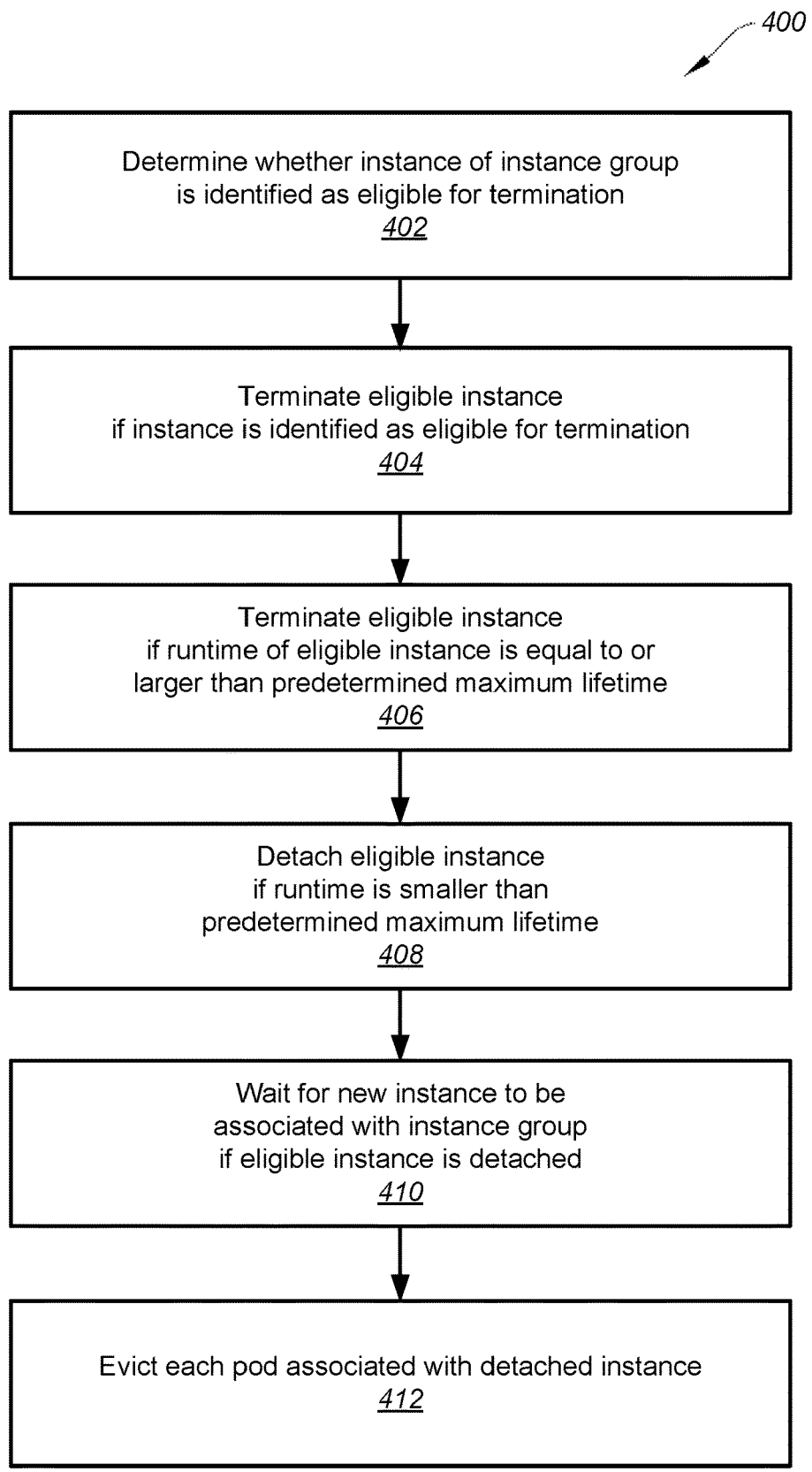
FIG. 4 is a simplified diagram showing a method for terminating an instance associated with an instance group of a computing platform according to one embodiment of the present invention.

FIG. 4 is a simplified diagram showing a method for terminating an instance associated with an instance group of a computing platform according to one embodiment of the present invention. This diagram is merely an example, which should not unduly limit the scope of the claims. One of ordinary skill in the art would recognize many variations, alternatives, and modifications. The method 400 includes processes 402-412 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 400 are performed by the system 100. In certain examples, some or all processes (e.g., steps) of the method 400 are performed by a computer and/or a processor directed by a code. For example, a computer includes a server computer and/or a client computer (e.g., a personal computer). In some examples, some or all processes (e.g., steps) of the method 400 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or a server rack).

In some embodiments, at the process 402, whether an instance of an instance group is identified as eligible for termination is determined. At the process 404, in response to determining that the instance of the instance group is identified as eligible for termination, the eligible instance is terminated. At the process 406, in response to a runtime of the eligible instance being equal to or larger than a predetermined maximum lifetime, the eligible instance is terminated. At the process 408, in response to the runtime being smaller than the predetermined maximum lifetime, the eligible instance from the instance group is detached to allow a new instance to be associated with the instance group. At the process 410, in response to the eligible instance being detached from the instance group, the new instance to be associated with the instance group is waited for. At the process 412, in response to the eligible instance being detached from the instance group, each pod associated with the detached instance is evicted.

Figure 5:
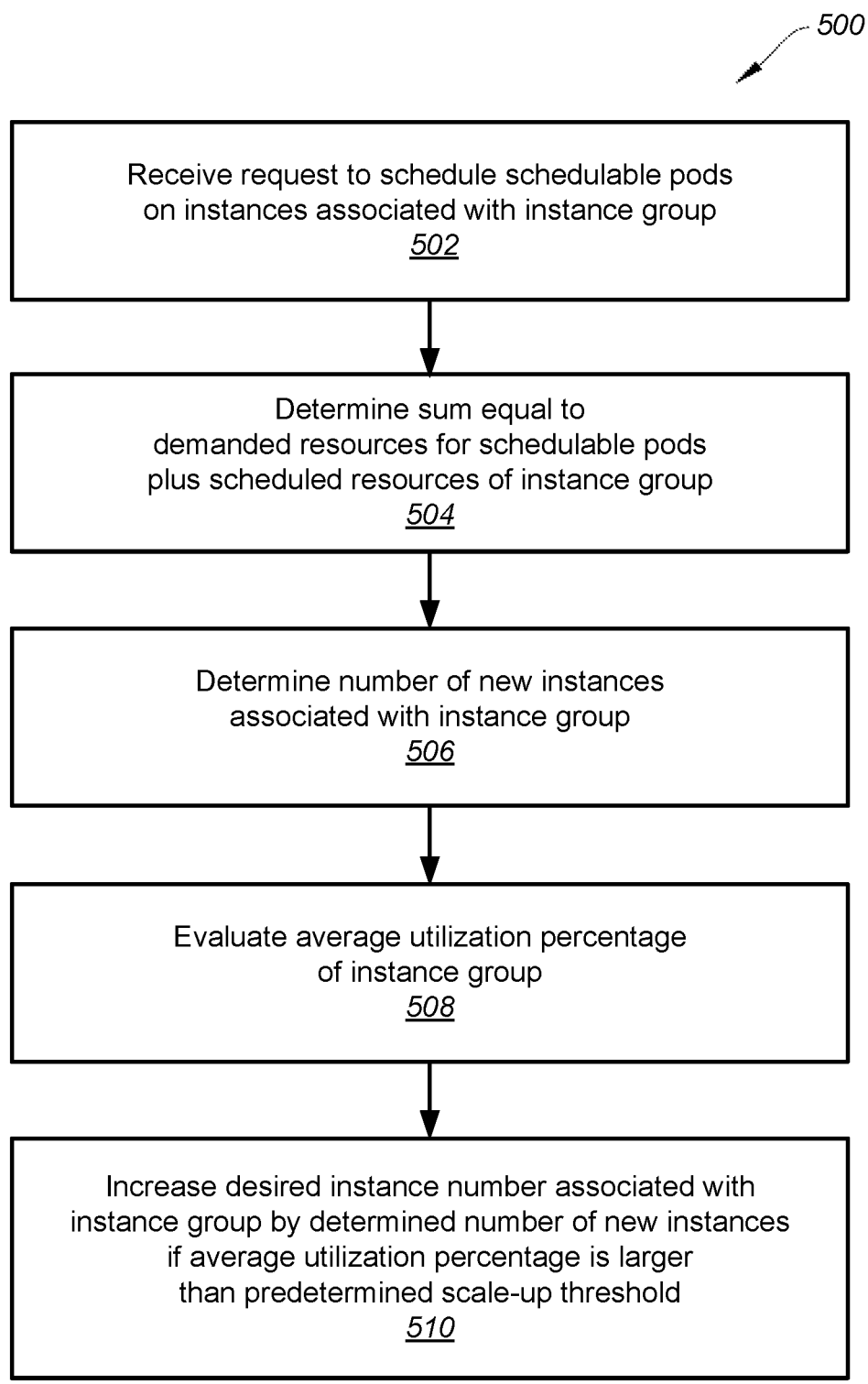
FIG. 5 is a simplified diagram showing a method for scaling up an instance group of a computing platform according to one embodiment of the present invention.

FIG. 5 is a simplified diagram showing a method for scaling up an instance group of a computing platform according to one embodiment of the present invention. This diagram is merely an example, which should not unduly limit the scope of the claims. One of ordinary skill in the art would recognize many variations, alternatives, and modifications. The method 500 includes processes 502-510 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 500 are performed by the system 100. In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 502, a request to schedule one or more schedulable pods on instances associated with an instance group of a computing platform is received. At the process 504, a first sum equal to demanded resources for the one or more schedulable pods plus scheduled resources of the instance group is determined. At the process 506, a number of new instances associated with the instance group based at least in part on the first sum is determined. At the process 508, an average utilization percentage of the instance group is evaluated. At the process 510, in response to the average utilization percentage being larger than a predetermined scale-up threshold, a desired instance number associated with the instance group is increased by the determined number of new instances.

Figure 6:
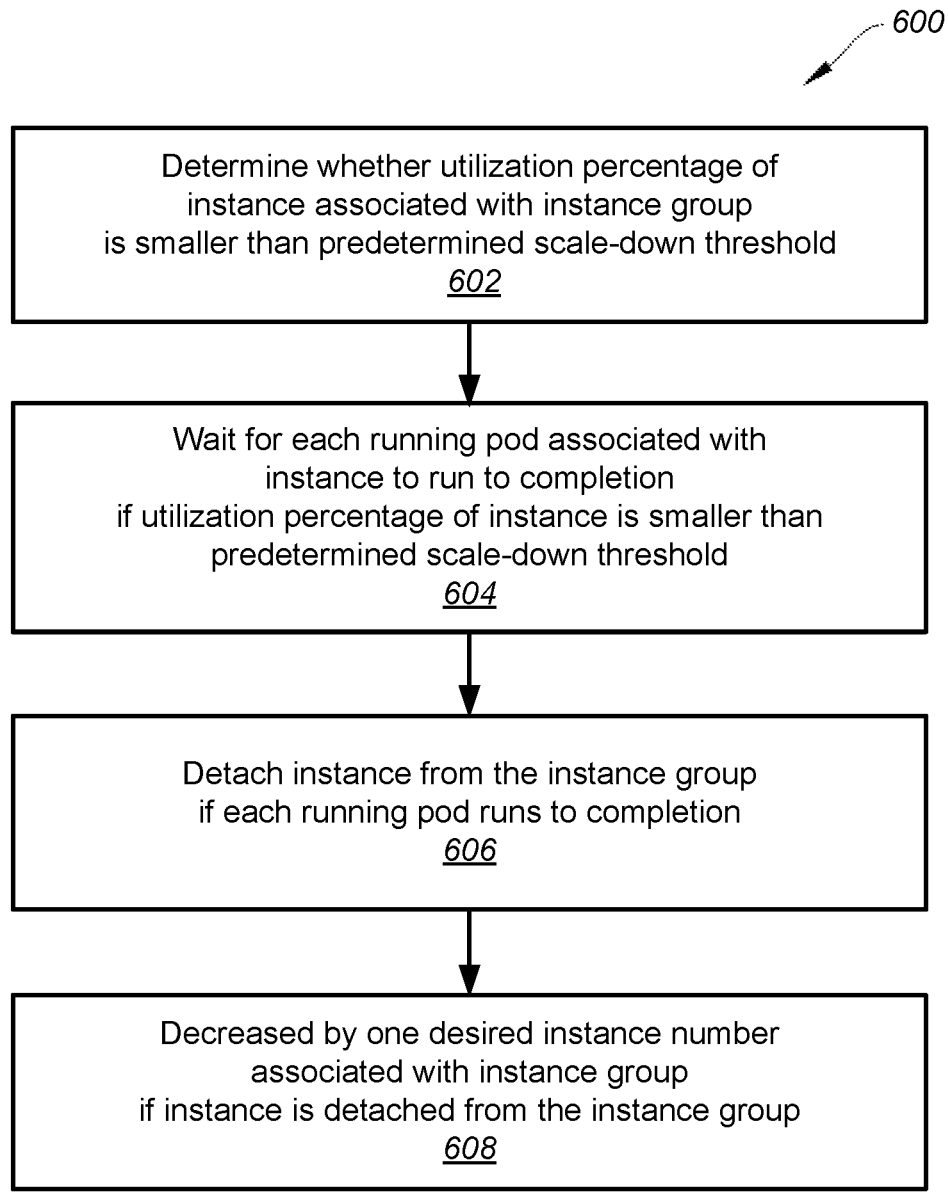
FIG. 6 is a simplified diagram showing a method for scaling down an instance group of a computing platform according to one embodiment of the present invention.

FIG. 6 is a simplified diagram showing a method for scaling down an instance group of a computing platform according to one embodiment of the present invention. This diagram is merely an example, which should not unduly limit the scope of the claims. One of ordinary skill in the art would recognize many variations, alternatives, and modifications. The method 600 includes processes 602-608 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 600 are performed by the system 100. In certain examples, some or all processes (e.g., steps) of the method 600 are performed by a computer and/or a processor directed by a code. For example, a computer includes a server computer and/or a client computer (e.g., a personal computer). In some examples, some or all processes (e.g., steps) of the method 600 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 602, whether a utilization percentage of an instance associated with the instance group is smaller than a predetermined scale-down threshold is determined. At the process 604, in response to determining that the utilization percentage of the instance is smaller than the predetermined scale-down threshold, each running pod associated with the instance to run to completion is waited for. At the process 606, in response to each running pod associated with the instance running to completion, the instance from the instance group is detached. At the process 608, in response to detaching the instance from the instance group, a desired instance number associated with the instance group is decreased by one.

FIG. 7 is a simplified diagram showing a method for scaling an instance group of a computing platform according to one embodiment of the present invention. This diagram is merely an example, which should not unduly limit the scope of the claims. One of ordinary skill in the art would recognize many variations, alternatives, and modifications. The method 700 includes processes 702-704 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 700 are performed by the system 100. In certain examples, some or all processes (e.g., steps) of the method 700 are performed by a computer and/or a processor directed by a code. For example, a computer includes a server computer and/or a client computer (e.g., a personal computer). In some examples, some or all processes (e.g., steps) of the method 700 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 702 the autoscaler 110 uses a predictive approach to scaling instances in an attempt to avoid over scaling in either the up or down direction. In certain embodiments, the autoscaler uses a predictive approach and determines whether to scale up or down the instance group (which includes scaling within an instance group if desired) by using historical data that is stored in memory from prior job executions. In some embodiments, the historical data includes one or more of: a data set size used in a prior related job and a code version for a prior related job. For example, data from prior jobs is stored as records in a historical database, or other data structure. The historical database stores for example, metadata from prior completed jobs. In some examples, the metadata includes job identification data, job type, data set size data representing the size of the data set used in the compute operation for the job, the time it took to complete the job, the frequency of the job (e.g., how many times the job has run over a particular time frame) and other historical job data. The autoscaler predicts whether there will be a need to scale up or down an instance for a job based on past experience of running the same job or a related job. In one example, a related job is one where the job to be scheduled uses a different version of the same compute code version, uses the same input data set(s) as a previous job, uses the same compute code version but with different size input data sets, or any other suitable criteria. A job is also considered related if it uses a same repository whose contents may change over time.

In one example, the autoscaler 110 compares a current compute code version of the job to be scheduled with versions stored in the historical database and when a match is found, the planned data set size of the job to be scheduled is compared to the data set size used in a prior related job found in the historical database. The time it took to finish the prior related job is evaluated. If the planned data set size for the job to be scheduled is smaller, the autoscaler determines that a down scaling can occur because it should take less time to complete the job to be scheduled due to the planned smaller data set size being used. At the process 704, in this example, the autoscaler scales the instance group down based on the determination. In one example, an upscaling operation occurs when the planned data set to be used on the job is larger than a date set used by a previous related job. The autoscaler determines that upscaling should occur because the data set is larger than previously used. Hence the autoscaler predicts future resource demands using historical data from previous jobs.

In some embodiments, the autoscaler 110 determines whether to scale the instance group up or down by comparing a current job code version, such as the job code version of the job to be scheduled, with a code version for a prior related job that is stored in the historical database. For example, certain code versions are determined to take longer to execute than other code version based on the time data stored to complete the prior jobs. When a code version of the job to be scheduled matches a code version in the historical data base, the time it took to complete the prior job is taken into account to determine if there are enough instances available to handle the job to be scheduled. If not, then the autoscaler upscales. Similarly, the autoscaler downscales when there are too many instances available. For example, if 100 resource units (Rus) are ordered/demanded by a client but only 80 RUs are currently being used and 70 RUs are predicted to be used by the autoscaler, then downscaling is employed to more efficiently use the RUs. The predictive control takes into account the data set size used and whether the code version changed or not.

In some embodiments, the autoscaler 110 determines whether to scale the instance group up or down by changing a weighting of the historical data based on whether the code version to run the job has changed. For example, the autoscaler assigns a weighting value on one or more historical data used to make the determination. In certain embodiments, code versions to run the jobs vary and some versions are determined to take longer or shorter to complete. In one example, the autoscaler changes the weight (e.g., decreases the weighting) assigned to the historical code version to reflect that the new code version will take longer and hence scaling up may be needed.

In some examples, the autoscaler 110 generates a prediction scaling value that indicates a level of scaling that is needed. In one example, the scaling value corresponds to a certain number of resource units (e.g., 5 CPU cores and 10 memory units) that are needed to upscale or downscale. However, it will be recognized that any suitable value and representations can be used. In some embodiments, the prediction scaling value is compared to a predefined threshold that varies as a function of determined resource availability, may be fixed and/or may be set by a platform administrator.

FIG. 8 is a simplified diagram showing a method 800 for scaling an instance group of a computing platform according to one embodiment of the present invention. This diagram is merely an example, which should not unduly limit the scope of the claims. One of ordinary skill in the art would recognize many variations, alternatives, and modifications. The method 800 includes processes 802-804 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 800 are performed by the system 100. In certain examples, some or all processes (e.g., steps) of the method 800 are performed by a computer and/or a processor directed by a code. For example, a computer includes a server computer and/or a client computer (e.g., a personal computer). In some examples, some or all processes (e.g., steps) of the method 800 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 802 the autoscaler 110 uses multiple control criteria to determine whether to auto-scale instances and determines whether to scale up or down an instance group by at least evaluating on-demand job request data for resource units (RUs), observing current job state data, and predicting resource unit need using historical data from prior related job executions. On-demand request data includes a request from a client or service to provide specified resource units. Current job state data includes data representing one or more states of a job being executed. At process 804 the autoscaler 110 scales the instance group up or down based on the determination.

Figure 9:
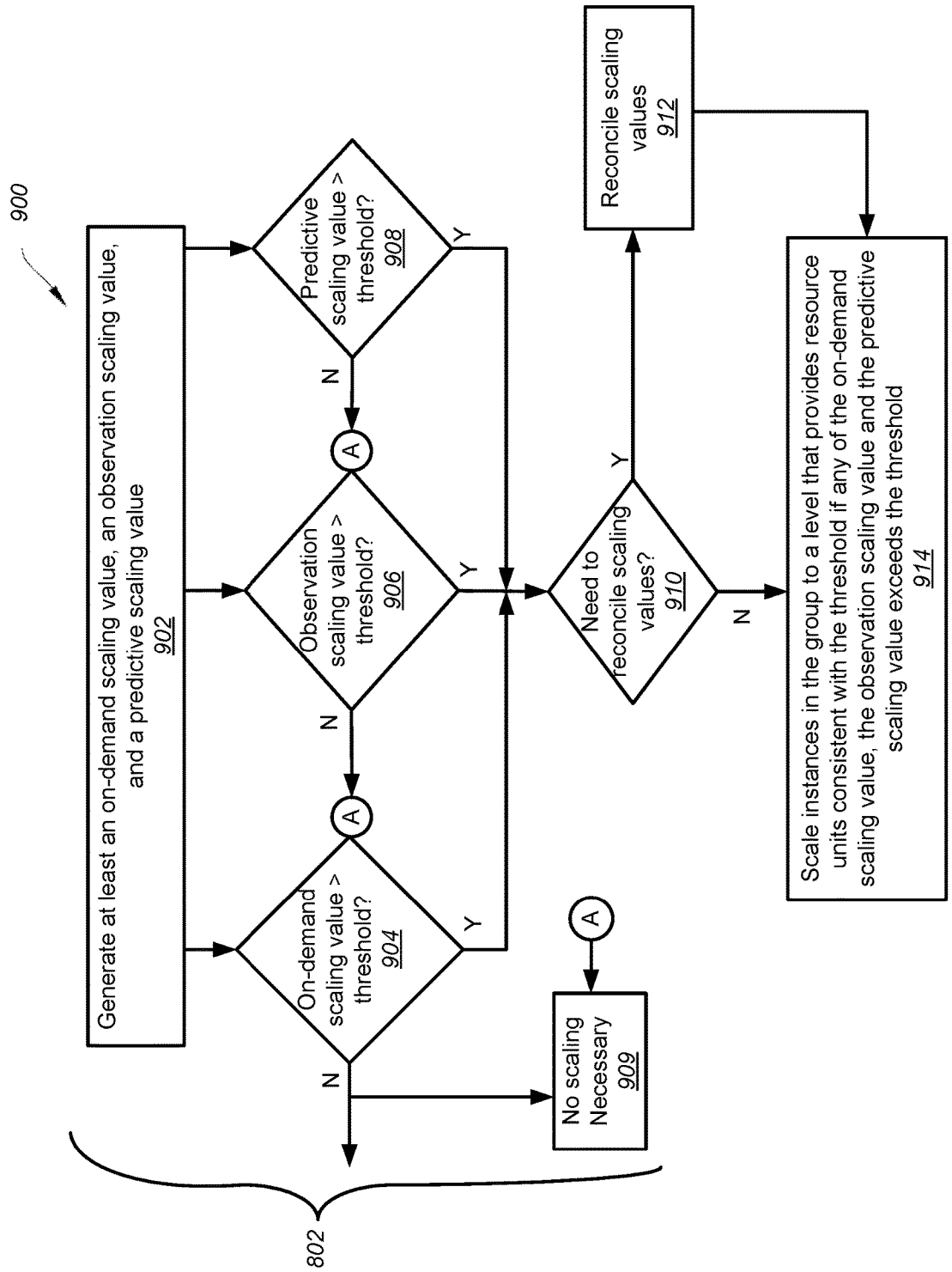
FIG. 9 is a simplified diagram showing a method for scaling an instance group of a computing platform according to one embodiment of the present invention.

FIG. 9 is a simplified diagram showing a method 900 for scaling an instance group of a computing platform according to one embodiment of the present invention. This diagram is merely an example, which should not unduly limit the scope of the claims. One of ordinary skill in the art would recognize many variations, alternatives, and modifications. The method 900 includes processes 902-914 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 900 are performed by the system 100. In certain examples, some or all processes (e.g., steps) of the method 900 are performed by a computer and/or a processor directed by a code. For example, a computer includes a server computer and/or a client computer (e.g., a personal computer). In some examples, some or all processes (e.g., steps) of the method 900 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 902 the autoscaler 110 generates scaling values and in this example generates at least an on-demand scaling value, an observation scaling value, and a predictive scaling value. Scaling the instance group up or down is based on one or more of the scaling values. A scaling value in one example includes bits indicating to scale up, to scale down or to provide no scaling. In another example a scaling value includes one or more bits representing a degree (e.g., numerical value) to which to scale up, to scale down or indicating not to provide scaling. In some examples, a scaling value includes one or more bits representing a number of instances (resource units) and hence needed for upscaling or a number of instances to be removed for downscaling. In some examples a programmable and stored threshold is compared for each scaling value. The thresholds can be zero or any suitable value and may be the same or different threshold values. In some examples the thresholds are determined on an ongoing basis and represent the amount of current eligible resources in a resource group or groups and/or an amount of predicted eligible resources (including if desired scheduled resources that will be available when needed) at a future time.

In certain embodiments, the on-demand scaling value is computed by subtracting a number of each type of resource unit asked for in a received on-demand instance request from a current number of corresponding eligible resources and/or scheduled resources that are predicted to become available when resources are needed. By way of example, if there are not enough eligible resources to match the requested amount then the scaling value indicates an upscale operation, and/or the number of resources needed in the upscale operation. If there are too many eligible resources, then a downscaling operation is indicated and/or the number of resources to be removed is the scaling value. In some examples, the on-demand operation takes into account data indicating job priority of an on-demand job, and even though there is an on-demand request, the system waits to finish other jobs before handling a lower priority on-demand request.

In some examples, the observational scaling value is computed using observed job state information on an ongoing basis to determine if additional or fewer instances are needed. By way of example, certain jobs may only be configured to run on particular instances. As such, certain jobs are mapped to certain instance types. When a job is to be scheduled that requires a particular instance type, the autoscaler compares the number of eligible instances of the type needed to the number of instances needed for the job. If none are available, then the scaling value indicates an upscaling operation and/or the number of instance to upscale. If there are too many eligible resources, then the scaling value indicates a downscaling operation and/or the number of resources to be removed is the scaling value.

In some examples, the predictive scaling value is computed using historical job data on an ongoing basis to determine if additional or fewer instances are needed. By way of example, when a related job is considered, the autoscaler computes the amount of time and resource units that it took to run the job previously and compares the previously needed resource units to the available resource units (e.g., the eligible instances and/or scheduled resources that will become available). If there are not enough resources, then the scaling value indicates that an upscaling operation is needed and/or indicates the number of instances to upscale. If there are too many eligible resources, then a downscaling operation is indicated and/or the number of resources to be removed is the scaling value.

In some examples, no on-demand request is present from clients at a given evaluation time and therefore the on-demand scaling value will indicate no scaling is needed. However, in some embodiments an observation scaling value is generated indicating that upscaling should occur such as when observed job state information for current multiple jobs indicate that there are not enough available CPU units and/or memory units to complete jobs within a desired time frame. In this same example, if the predictive scaling value also indicates that no additional scaling will be necessary based on historical data, the autoscaler will scale up to accommodate the observation scaling value that indicates up scaling is desired. No reconciliation is needed in this example since only upscaling is indicated.

However, in other examples, reconciliation among scaling values may be necessary such as when one scaling value indicates to up-scale and another indicates that down-scaling should be done. In certain embodiments, whether to scale up or down the instance group includes reconciling conflicting scaling values by giving priority to the on-demand scaling value. Priority is given to on-demand instance requests so that on-demand requests (e.g., on-demand objects) are handled quickly and accurately. For example, an on-demand request for resources may be received from a client while jobs are being executed throughout the platform. If the predictive scaling value indicates that downscaling should occur, but the on-demand scaling value indicates that up scaling should occur, priority is given to the on-demand scaling value and the autoscaler will provide upscaling to properly service the on-demand request. In some embodiments, reconciling the scaling values includes the observation scaling value being given priority over the predictive scaling value or vice versa. However, it will be recognized that any suitable priority may be employed. Also, the scaling values can be determined in any suitable manner.

Where thresholds are used, at the process in 904, 906 and 908, the autoscaler 110 compares each of the on-demand scaling value, the observation scaling value and the predictive scaling value to a threshold value(s). The threshold values are programmable and in one example represent a number of eligible resources. If the threshold value(s) is not exceeded, no scaling is performed as shown by the process 909. If one or more scaling values are beyond a respective threshold, the process 910 determines if reconciliation of scaling values is necessary. If reconciliation is necessary, then process 912 reconciles scaling values as noted above and process 914 scales instances in the group to a level that provides resource units consistent with the threshold values if any of the on-demand scaling value, the observation scaling value and the predictive scaling value exceeds the threshold values. For example, as noted above, in one example if a threshold value indicates that 6 CPU cores and 10 memory units are eligible but that 8 cores and 16 memory units are needed, the autoscaler 110 scales up instances to provide 2 more CPU cores and 6 more memory units.

Figure 10:
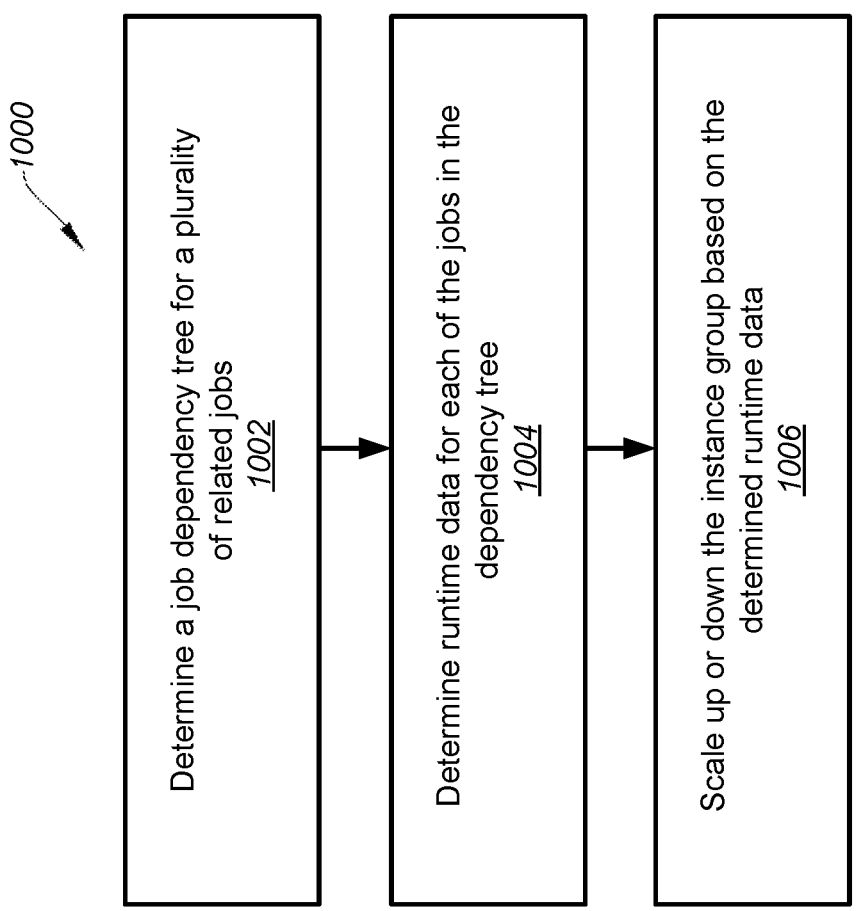
FIG. 10 is a simplified diagram showing a method for scaling an instance group of a computing platform according to one embodiment of the present invention.

FIG. 10 is a simplified diagram showing a method 1000 for scaling an instance group of a computing platform according to one embodiment of the present invention. This diagram is merely an example, which should not unduly limit the scope of the claims. One of ordinary skill in the art would recognize many variations, alternatives, and modifications. The method 1000 includes processes 1002-1006 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 1000 are performed by the system 100. In certain examples, some or all processes (e.g., steps) of the method 1000 are performed by a computer and/or a processor directed by a code. For example, a computer includes a server computer and/or a client computer (e.g., a personal computer). In some examples, some or all processes (e.g., steps) of the method 1000 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 1002 autoscaler 110, scheduler 116 or other service determines a job dependency tree for a plurality of related jobs. For example, related jobs may have data sets that depend on each other such that a data set output from one job serves as the input data set for one or more other jobs. As another example, jobs are also related by using different versions of the same compute code. Other relationships may also be employed. The job dependency tree in one example is stored in memory as part of the historical database and/or may also be obtained from a security permission system. The process 1004 determines runtime data for each of the jobs in the dependency tree such as from the historical database that stores metadata for each dependent job. In this example the metadata includes runtime length for each job. The process 1006 scales up or down the instance group based on the determined runtime data. For example, runtime length is accumulated for all jobs in the dependency tree for the job. The system determines if there is an instance available with an appropriate runtime length that meets or exceeds the accumulated runtime length of the dependencies so that the job assigned to an instance that can complete the duration of the job and all of its dependencies.

In some embodiments, the computing platform issues a primary request for instances from a cluster provider with a first set of resource unit criteria in response to a determination to up-scale and also issues a fallback instance request that includes a second and different set of resource unit criteria that provides proper job execution when the primary request is denied. For example, the cluster provider may not have the requested CPU cores and/or memory available in server machines in a given geographic region and may deny the primary request. The computing platform computes and sends a fallback instance request with the primary request or in response to the primary request being denied, that will still allow a job or set of jobs to be properly serviced but with different resource units. For example, the primary request may include a request for a particular type and number of CPU cores and the fallback instance request includes the same or different number of CPU cores but requests a different CPU type (e.g., different processing speed or manufacturer) and/or same CPU to memory ratios but with using different numbers of cores. Any other suitable variations will be recognized by those of ordinary skill in the art. Submitting fallback instance requests can reduce latency in providing job executions due to getting new resources allocated from a cluster provider in a much faster manner.

Certain benefits can result from certain of the above operations. In some examples, latency between a time that instance requests for resources are sent to a cluster provider and the time the instances are actually available for use from the cluster provider is taken into account so that downscaling and upscaling operations are more accurately handled. In some examples, checks are made to determine a number of resources needed based on current conditions and on predicted conditions and compared to a number of resources requested by a client. In certain instances, fewer resources can be used than requested by the client resulting in a savings on a cost/compute hour basis.

Figure 11:
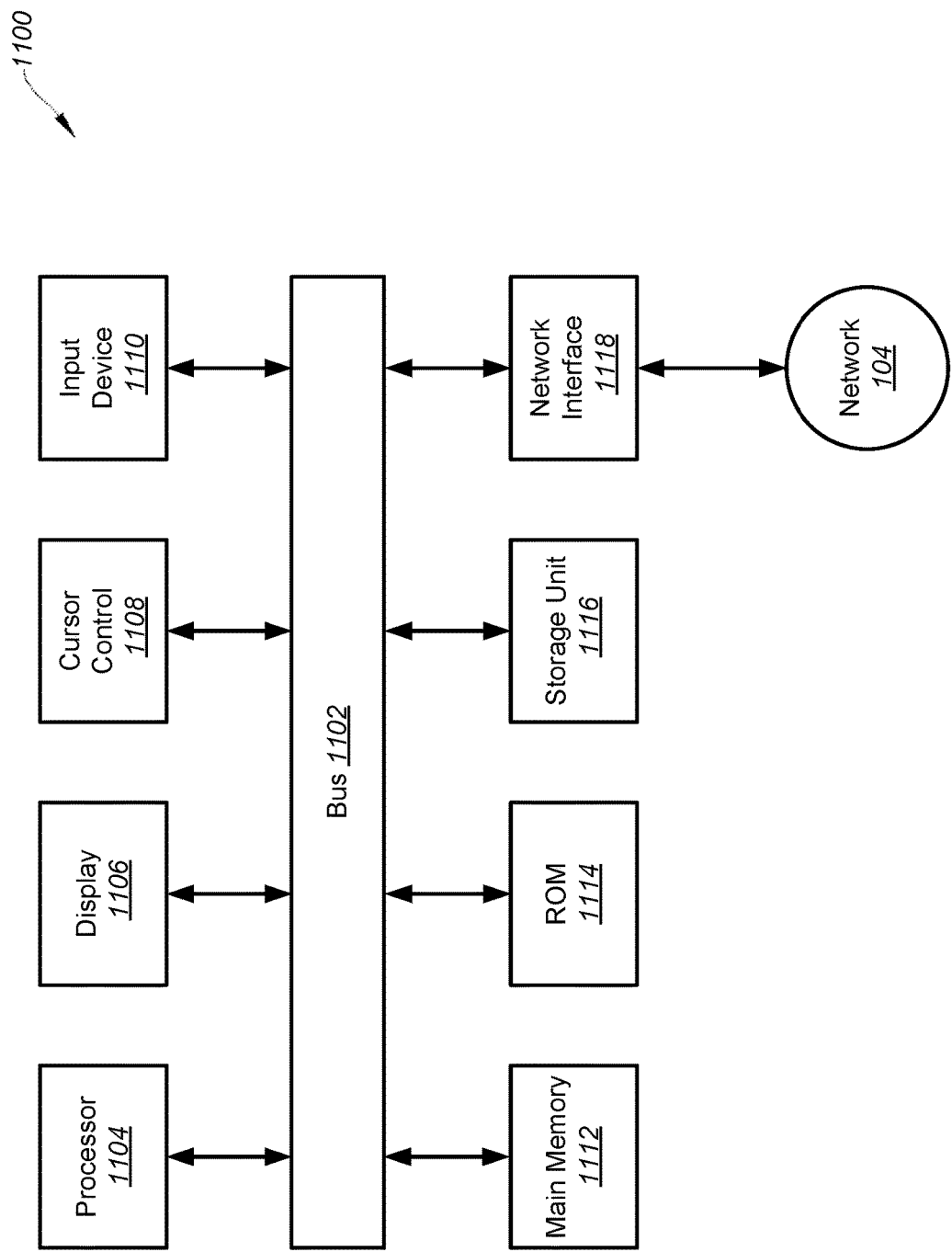
FIG. 11 is a simplified diagram showing a computing system for implementing a system for terminating instances and/or autoscaling instance groups of a computing platform according to one embodiment of the present invention.

FIG. 11 is a simplified diagram showing a computing system for implementing a system for terminating instances and/or autoscaling instance groups of a computing platform according to one embodiment of the present invention. This diagram is merely an example, which should not unduly limit the scope of the claims. One of ordinary skill in the art would recognize many variations, alternatives, and modifications. The computing system 1100 includes a bus 1102 or other communication mechanism for communicating information, a processor 1104, a display 1106, a cursor control component 1108, an input device 1110, a main memory 1112, a read only memory (ROM) 1114, a storage unit 1116, and a network interface 1118. In some embodiments, some or all processes (e.g., steps) of the method 400, the method 500, and/or the method 600 are performed by the computing system 1100. In some examples, the bus 1102 is coupled to the processor 1104, the display 1106, the cursor control component 1107, the input device 1110, the main memory 1112, the read only memory (ROM) 1114, the storage unit 1116, and/or the network interface 1118. In certain examples, the network interface is coupled to a network 1120. For example, the processor 1104 includes one or more general purpose microprocessors. In some examples, the main memory 1112 (e.g., random access memory (RAM), cache and/or other dynamic storage devices) is configured to store information and instructions to be executed by the processor 1104. In certain examples, the main memory 1112 is configured to store temporary variables or other intermediate information during execution of instructions to be executed by processor 1104. For examples, the instructions, when stored in the storage unit 1116 accessible to processor 1104, render the computing system 1100 into a special-purpose machine that is customized to perform the operations specified in the instructions. In some examples, the ROM 1114 is configured to store static information and instructions for the processor 1104. In certain examples, the storage unit 1116 (e.g., a magnetic disk, optical disk, or flash drive) is configured to store information and instructions.

In some embodiments, the display 1106 (e.g., a cathode ray tube (CRT), an LCD display, or a touch screen) is configured to display information to a user of the computing system 1100. In some examples, the input device 1110 (e.g., alphanumeric and other keys) is configured to communicate information and commands to the processor 1104. For example, the cursor control 1108 (e.g., a mouse, a trackball, or cursor direction keys) is configured to communicate additional information and commands (e.g., to control cursor movements on the display 1106) to the processor 1104.

According to some embodiments, a method for scaling an instance group of a computing platform includes determining whether to scale up or down the instance group by using historical data from prior jobs. The historical data includes one or more of: a data set size used in a prior related job and a code version for a prior related job. The method further includes scaling the instance group up or down based on the determination. The method is performed using one or more processors. For example, the method is implemented according to at least FIG. 1, FIG. 2, FIG. 3, FIG. 7 and/or FIG. 11.

In some examples, the determining whether to scale up or down the instance group includes comparing a planned data set size to be used for a job with the data set size used in a prior related job. In certain examples, the determining whether to scale up or down the instance group includes comparing a current job code version with a code version for a prior related job. In some examples, the determining whether to scale up or down the instance group includes changing a weighting of the historical data based on whether the code version to run the job has changed.

According to certain embodiments, a method for scaling an instance group of a computing platform includes determining whether to scale up or down the instance group by at least evaluating on-demand job request data for resource units (RUs), observing current job state data, and predicting resource unit need using historical data from prior related job execution. The method further includes scaling the instance group up or down based on the determination. The method is performed using one or more or processors. For example, the method is implemented according to at least FIG. 1, FIG. 2, FIG. 3, FIG. 7, FIG. 8, FIG. 9 and/or FIG. 11.

In some examples, the determining whether to scale up or down the instance group includes generating at least an on-demand scaling value, an observation scaling value, and a predictive scaling value and scaling the instance group up or down based on at least one of the scaling values.

In certain examples, the method further includes comparing each of the on-demand scaling value, the observation scaling value and the predictive scaling value to a threshold. The method also includes scaling instances in the group to a level that provides resource units consistent with the threshold if any of the on-demand scaling value, the observation scaling value and the predictive scaling value exceeds the threshold. In some examples, the method further includes reconciling conflicting scaling values by giving priority to the on-demand scaling value. In certain examples, the method further includes issuing a primary request for instances from a cluster provider and issue a fallback request that includes a different set of RU criteria that provides proper job execution when the primary request is denied.

In certain examples a method includes issuing a primary request for instances from a cluster provider and issuing a fallback request that includes a different set of RU criteria that provides proper job execution when the primary request is denied.

In some embodiments, a method for scaling an instance group of a computing platform includes determining a job dependency tree for a plurality of related jobs, determining runtime data for each of the jobs in the dependency tree and scaling up or down the instance group based on the determined runtime data. The method is performed using one or more processors. For example, the method is implemented according to at least FIG. 1, FIG. 2, FIG. 3, FIG. 7, FIG. 8, FIG. 9, FIG. 10 and/or FIG. 11.

According to certain embodiments, a computer-implemented system for scaling an instance group of a computing platform includes one or more processors and a memory storing instructions, the instructions, when executed by the one or more processors, causing the system to perform determining whether to scale up or down the instance group by using historical data from prior jobs wherein the historical data comprises one or more of: a data set size used in a prior related job and a code version for a prior related job, and scaling the instance group up or down based on the determination. For example, the system is implemented according to at least FIG. 1, FIG. 2, FIG. 3, FIG. 7 and/or FIG. 11.

In some examples, the instructions, when executed by the one or more processors, cause the system to determine whether to scale up or down the instance group by comparing a planned data set size to be used for a job with the data set size used in a prior related job.

In certain examples, the instructions, when executed by the one or more processors, cause the system to determine whether to scale up or down the instance group by comparing a current job code version with a code version for a prior related job.

In some examples, the instructions, when executed by the one or more processors, cause the system to determine whether to scale up or down the instance group by changing a weighting of the historical data based on whether the code version to run the job has changed.

According to certain embodiments, a computer-implemented system for scaling an instance group of a computing platform includes one or more processors and a memory storing instructions, the instructions, when executed by the one or more processors, causing the system to perform determining whether to scale up or down the instance group by at least evaluating on-demand job request data for resource units (RUs), observing current job state data, and predicting resource unit need using historical data from prior related job executions and scaling the instance group up or down based on the determination. For example, the system is implemented according to at least FIG. 1, FIG. 2, FIG. 3, FIG. 7, FIG. 8, FIG. 9 and/or FIG. 11.

In some examples, the instructions, when executed by the one or more processors, cause the system to determine whether to scale up or down the instance group by generating at least an on-demand scaling value, an observation scaling value, and a predictive scaling value and scaling the instance group up or down based on at least one of the scaling values.

In certain examples, the instructions, when executed by the one or more processors, cause the system to determine whether to scale up or down the instance group by comparing each of the on-demand scaling value, the observation scaling value and the predictive scaling value to a threshold and scaling instances in the group to a level that provides resource units consistent with the threshold if any of the on-demand scaling value, the observation scaling value and the predictive scaling value exceeds the threshold.

In some examples, the instructions, when executed by the one or more processors, cause the system to determine whether to scale up or down the instance group by reconciling conflicting scaling values by giving priority to the on-demand scaling value.

In certain examples, the instructions, that when executed by the one or more processors, causes the system to issue a primary request for instances from a cluster provider and issue a fallback request that includes a different set of RU criteria that provides proper job execution when the primary request is denied.

According to some embodiments, a computer-implemented system for scaling an instance group of a computing platform includes one or more processors and a memory storing instructions, the instructions, when executed by the one or more processors, causing the system to perform determining a job dependency tree for a plurality of related jobs, determining runtime data for each of the jobs in the dependency tree and scaling up or down the instance group based on the determined runtime data. For example, the system is implemented according to at least FIG. 1, FIG. 2, FIG. 3, FIG. 7, FIG. 8, FIG. 9, FIG. 10 and/or FIG. 11.

Some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for scaling an instance group of a computing platform, the method comprising:
 determining whether to scale up or down the instance group by at least evaluating on-demand job request data for resource units (RUs), observing current job state data, and predicting resource unit need using historical data from prior related job executions, generating at least an on-demand scaling value, an observation scaling value, and a predictive scaling value associated with the historical data from prior related job executions and comparing each of the on-demand scaling value, the observation scaling value and the predictive scaling value to a threshold; and
 scaling instances in the instance group up or down based on at least one of the on-demand scaling value, the observation scaling value, or the predictive scaling value, by scaling instances in the group to a level that provides resource units consistent with the threshold if any of the on-demand scaling value, the observation scaling value and the predictive scaling value exceeds the threshold;
 wherein the method is performed using one or more or processors.

2. The method of claim 1 wherein:
the determining whether to scale up or down the instance group comprises reconciling conflicting scaling values by giving priority to the on-demand scaling value.

3. The method of claim 1 further comprising issuing a primary request for instances from a cluster provider and issue a fallback request that includes a different set of RU criteria that provides proper job execution when the primary request is denied.

4. A computer-implemented system for scaling an instance group of a computing platform, the system comprising:
one or more processors; and
a memory storing instructions, the instructions, when executed by the one or more processors, causing the system to perform:
determining whether to scale up or down the instance group by at least evaluating on-demand job request data for resource units (RUs), observing current job state data, and predicting resource unit need using historical data from prior related job executions,
generating at least an on-demand scaling value, an observation scaling value, and a predictive scaling value associated with the historical data from prior related job executions,
determining whether to scale up or down the instance group by comparing each of the on-demand scaling value, the observation scaling value and the predictive scaling value to a threshold; and
scaling instances in the instance group up or down based on at least one of the on-demand scaling value, the observation scaling value, or the predictive scaling value, to a level that provides resource units consistent with the threshold if any of the on-demand scaling value, the observation scaling value and the predictive scaling value exceeds the threshold.

5. The computer implemented system of claim 4 wherein the memory stores instructions, the instructions, when executed by the one or more processors, causing the system to further reconcile conflicting scaling values by giving priority to the on-demand scaling value.

6. The computer implemented system of claim 4 wherein the memory stores instructions, that when executed by the one or more processors, causes the system to issue a primary request for instances from a cluster provider and issue a fallback request that includes a different set of RU criteria that provides proper job execution when the primary request is denied.

7. The method of claim 1 wherein the determining whether to scale up or down the instance group comprises comparing a planned data set size to be used for a job with the data set size used in a prior related job.

8. The method of claim 1 wherein the determining whether to scale up or down the instance group comprises comparing a current job code version with a code version for a prior related job.

9. The method of claim 1 wherein the determining whether to scale up or down the instance group comprises changing a weighting of the historical data based on whether the code version to run the job has changed.

10. The method of claim 4 wherein the determining whether to scale up or down the instance group comprises comparing a planned data set size to be used for a job with the data set size used in a prior related job.

11. The method of claim 4 wherein the determining whether to scale up or down the instance group comprises comparing a current job code version with a code version for a prior related job.

12. The method of claim 4 wherein the determining whether to scale up or down the instance group comprises changing a weighting of the historical data based on whether the code version to run the job has changed.

13. A non-transitory storage medium comprising stored instructions that when executed by one or more processors, cause the one or more processors to:
determine whether to scale up or down the instance group by at least evaluating on-demand job request data for resource units (RUs), observing current job state data, and predicting resource unit need using historical data from prior related job executions;
generating at least an on-demand scaling value, an observation scaling value, and a predictive scaling value associated with the historical data from prior related job executions;
compare each of the on-demand scaling value, the observation scaling value and the predictive scaling value to a threshold; and
scale instances in the instance group up or down based on at least one of the on-demand scaling value, the observation scaling value, or the predictive scaling value, to a level that provides resource units consistent with the threshold if any of the on-demand scaling value, the observation scaling value and the predictive scaling value exceeds the threshold.

14. The storage medium of claim 13 comprising executable instructions that cause the one or more processors to reconcile conflicting scaling values by giving priority to the on-demand scaling value.

15. The storage medium of claim 13 comprising executable instructions that cause the one or more processors to issue a primary request for instances from a cluster provider and issue a fallback request that includes a different set of RU criteria that provides proper job execution when the primary request is denied.

16. The storage medium of claim 13 comprising executable instructions that cause the one or more processors to compare a planned data set size to be used for a job with the data set size used in a prior related job.

17. The storage medium of claim 13 comprising executable instructions that cause the one or more processors to compare a current job code version with a code version for a prior related job.

* * * * *